United States Patent
Ee et al.

(10) Patent No.: US 9,491,085 B2
(45) Date of Patent: Nov. 8, 2016

(54) METHODS AND APPARATUS TO ROUTE CONTROL PACKETS BASED ON ADDRESS PARTITIONING

(75) Inventors: Cheng Tien Ee, Rockaway, NJ (US); Lee M. Breslau, Basking Ridge, NJ (US); Kadangode K. Ramakrishnan, Berkeley Heights, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 457 days.

(21) Appl. No.: 12/786,162

(22) Filed: May 24, 2010

(65) Prior Publication Data

US 2011/0286457 A1    Nov. 24, 2011

(51) Int. Cl.
| H04L 12/28 | (2006.01) |
| H04L 12/701 | (2013.01) |
| H04L 12/713 | (2013.01) |
| H04L 12/741 | (2013.01) |
| H04L 12/743 | (2013.01) |

(52) U.S. Cl.
CPC .............. H04L 45/00 (2013.01); H04L 45/586 (2013.01); *H04L 45/54* (2013.01); *H04L 45/7457* (2013.01)

(58) Field of Classification Search
None
See application file for complete search history.

(56) References Cited

U.S. PATENT DOCUMENTS

| 5,841,775 | A | 11/1998 | Huang |
| 5,917,820 | A | 6/1999 | Rekhter |
| 5,951,651 | A | 9/1999 | Lakshman et al. |
| 5,991,300 | A * | 11/1999 | Tappan .................... 370/392 |
| 6,044,080 | A | 3/2000 | Antonov |
| 6,070,187 | A * | 5/2000 | Subramaniam et al. ..... 709/220 |
| 6,081,522 | A | 6/2000 | Hendel et al. |
| 6,088,356 | A | 7/2000 | Hendel et al. |
| 6,094,435 | A | 7/2000 | Hoffman et al. |
| 6,192,051 | B1 | 2/2001 | Lipman et al. |
| 6,253,230 | B1 | 6/2001 | Couland et al. |
| 6,256,314 | B1 | 7/2001 | Rodrig et al. |
| 6,259,699 | B1 * | 7/2001 | Opalka et al. ................ 370/398 |
| 6,397,260 | B1 * | 5/2002 | Wils et al. .................... 709/238 |
| 6,438,671 | B1 | 8/2002 | Doing et al. |
| 6,473,431 | B1 * | 10/2002 | Perlman et al. .............. 370/400 |
| 6,529,475 | B1 | 3/2003 | Wan et al. |
| 6,563,823 | B1 | 5/2003 | Przygienda et al. |
| 6,625,650 | B2 | 9/2003 | Stelliga |
| 6,665,495 | B1 | 12/2003 | Miles et al. |
| 6,680,942 | B2 | 1/2004 | Mead et al. |

(Continued)

OTHER PUBLICATIONS

USPTO, "Notice of Allowance," issued in connection with U.S. Appl. No. 12/343,707, dated Apr. 28, 2011 (7 pages).

(Continued)

*Primary Examiner* — Marsha D Banks Harold
*Assistant Examiner* — Christopher Wyllie
(74) *Attorney, Agent, or Firm* — Hanley, Flight & Zimmerman, LLC

(57) ABSTRACT

Methods and apparatus to route control packets based on address partitioning. A disclosed example method includes receiving a packet in a server, determining the packet is a control packet, forwarding the packet to a processor, identifying via the processor an address prefix of the packet, accessing a forwarding table and determining via the processor at least one of a router or an outgoing interface that corresponds to the identified address prefix, transmitting the packet from the processor to the server via the outgoing interface, and statically forwarding the packet from the server to the router based on an interface that received the packet from the processor.

16 Claims, 9 Drawing Sheets

(56) References Cited

U.S. PATENT DOCUMENTS

| | | | |
|---|---|---|---|
| 6,683,874 B1 | 1/2004 | Nagami | |
| 6,721,334 B1 | 4/2004 | Ketcham | |
| 6,771,673 B1 | 8/2004 | Baum et al. | |
| 6,820,132 B1 | 11/2004 | Puente et al. | |
| 6,826,613 B1 | 11/2004 | Wang et al. | |
| 6,847,643 B2 | 1/2005 | Nie | |
| 6,850,525 B2 | 2/2005 | Mitsumori et al. | |
| 6,873,620 B1 | 3/2005 | Coveley et al. | |
| 6,873,627 B1 | 3/2005 | Miller et al. | |
| 6,996,630 B1 | 2/2006 | Masaki et al. | |
| 7,012,919 B1 | 3/2006 | So et al. | |
| 7,024,487 B2 | 4/2006 | Mochizuki et al. | |
| 7,046,680 B1 | 5/2006 | McDysan et al. | |
| 7,065,038 B1 | 6/2006 | Brandt et al. | |
| 7,190,678 B2 | 3/2007 | Thubert et al. | |
| 7,209,439 B2 | 4/2007 | Rawlins et al. | |
| 7,362,702 B2 | 4/2008 | Terrell et al. | |
| 7,362,707 B2 | 4/2008 | MeLampy et al. | |
| 7,411,965 B2 | 8/2008 | Chu et al. | |
| 7,467,227 B1* | 12/2008 | Nguyen | H04L 12/2856 709/238 |
| 7,536,464 B1 | 5/2009 | Dommety et al. | |
| 8,031,627 B2* | 10/2011 | Ee | H04L 12/2697 370/252 |
| 8,261,125 B2 | 9/2012 | Wenzel | |
| 8,331,369 B2* | 12/2012 | Ee | H04L 12/2697 370/351 |
| 8,572,281 B1* | 10/2013 | Jesuraj | H04L 45/025 709/238 |
| 8,687,638 B2* | 4/2014 | Ee | H04L 12/2697 370/351 |
| 8,699,484 B2* | 4/2014 | Ee | H04L 45/58 370/389 |
| 2002/0027917 A1* | 3/2002 | Sugai et al. | 370/394 |
| 2002/0031107 A1* | 3/2002 | Li et al. | 370/338 |
| 2002/0059545 A1* | 5/2002 | Nakashima et al. | 714/43 |
| 2002/0116491 A1 | 8/2002 | Boyd et al. | |
| 2003/0005148 A1 | 1/2003 | Mochizuki et al. | |
| 2003/0067912 A1 | 4/2003 | Mead et al. | |
| 2003/0081615 A1* | 5/2003 | Kohn et al. | 370/395.42 |
| 2003/0088671 A1 | 5/2003 | Klinker et al. | |
| 2003/0108052 A1 | 6/2003 | Inoue et al. | |
| 2003/0115321 A1 | 6/2003 | Edmison et al. | |
| 2003/0147376 A1 | 8/2003 | Coutinho et al. | |
| 2003/0154236 A1* | 8/2003 | Dar et al. | 709/201 |
| 2003/0177374 A1* | 9/2003 | Yung et al. | 713/189 |
| 2004/0010594 A1* | 1/2004 | Boyd | H04L 63/0485 709/227 |
| 2004/0049714 A1 | 3/2004 | Marples et al. | |
| 2004/0076160 A1 | 4/2004 | Phaltankar | |
| 2004/0095943 A1 | 5/2004 | Korotin | |
| 2004/0170156 A1 | 9/2004 | O'Neill | |
| 2004/0196854 A1* | 10/2004 | Thubert et al. | 370/395.31 |
| 2005/0030936 A1 | 2/2005 | Van Den Bosch | |
| 2005/0041675 A1* | 2/2005 | Trostle et al. | 370/401 |
| 2005/0169270 A1 | 8/2005 | Mutou et al. | |
| 2005/0265308 A1* | 12/2005 | Barbir | H04L 12/4641 370/351 |
| 2006/0039385 A1 | 2/2006 | Bare et al. | |
| 2006/0053221 A1* | 3/2006 | Matsui | H04L 45/42 709/225 |
| 2006/0056420 A1* | 3/2006 | Okuda et al. | 370/395.54 |
| 2006/0098613 A1* | 5/2006 | Kish | H04N 21/6405 370/338 |
| 2006/0120374 A1* | 6/2006 | Yoshimoto et al. | 370/392 |
| 2006/0159095 A1* | 7/2006 | Cook et al. | 370/392 |
| 2006/0168246 A1 | 7/2006 | Mochizuki et al. | |
| 2006/0221832 A1* | 10/2006 | Muller et al. | 370/235 |
| 2006/0221990 A1* | 10/2006 | Muller et al. | 370/412 |
| 2006/0224724 A1 | 10/2006 | Marinescu et al. | |
| 2007/0019657 A1* | 1/2007 | Takayama | 370/401 |
| 2007/0058491 A1 | 3/2007 | Dahlen et al. | |
| 2007/0195715 A1* | 8/2007 | Yamano et al. | 370/254 |
| 2008/0013551 A1 | 1/2008 | Scholl | |
| 2008/0155093 A1 | 6/2008 | Dharmistan | |
| 2008/0209273 A1 | 8/2008 | Bahl et al. | |
| 2008/0225713 A1 | 9/2008 | Tychon et al. | |
| 2008/0267195 A1 | 10/2008 | Belmon | |
| 2009/0031022 A1 | 1/2009 | Wexler et al. | |
| 2009/0031041 A1 | 1/2009 | Clemmensen | |
| 2009/0196181 A1* | 8/2009 | Retana et al. | 370/235.1 |
| 2010/0008233 A1* | 1/2010 | Ee | H04L 12/2697 370/241 |
| 2010/0008240 A1 | 1/2010 | Ee et al. | |
| 2010/0008363 A1* | 1/2010 | Ee | H04L 12/2697 370/392 |
| 2010/0226251 A1* | 9/2010 | Imai et al. | 370/235 |
| 2010/0226368 A1 | 9/2010 | Mack-Crane et al. | |
| 2011/0142053 A1* | 6/2011 | Van Der Merwe et al. | 370/395.1 |
| 2011/0149964 A1* | 6/2011 | Judge et al. | 370/392 |
| 2011/0286342 A1* | 11/2011 | Ee | H04L 45/58 370/252 |
| 2011/0286457 A1* | 11/2011 | Ee | H04L 45/00 370/392 |
| 2013/0107884 A1* | 5/2013 | Ee | H04L 12/2697 370/392 |

OTHER PUBLICATIONS

USPTO, "Notice of Allowance," issued in connection with U.S. Appl. No. 12/343,735, dated Feb. 11, 2011 (9 pages).

USPTO, "Office Action," issued in connection with U.S. Appl. No. 12/343,719, dated Apr. 14, 2011 (26 pages).

USPTO, "Final Office Action," issued in connection with U.S. Appl. No. 12/343,719, dated Nov. 16, 2011 (28 pages).

USPTO, "Notice of Allowance," issued in connection with U.S. Appl. No. 12/343,719, dated Aug. 13, 2012 (9 pages).

Uspto, "Office Action," issued in connection with U.S. Appl. No. 13/691,167, dated Apr. 24, 2013 (27 pages).

USPTO, "Office Action," issued in connection with U.S. Appl. No. 12/786,157, dated Oct. 2, 2012 (11 pages).

Chang et al., "An Empirical Study of Router Response to Large BGP Routing Table Load," Internet Measurement Conference; Proceedings of the 2nd ACM SIGCOMM Workshop on Internet Measurement, held in Marseille, France, pp. 203-208, 2002 (6 pages).

Demers et al., "Analysis and Simulation of a Fair Queueing Algorithm," Applications, Technologies, Architectures, and Protocols for Computer Communication; Symposium Proceedings on Communications Architectures and Protocols, held in Austin, United States, pp. 1-12, 1989 (12 pages).

Bu et al., "On Characterizing BGP Routing Table Growth," Computer Networks: The International Journal of Computer and Telecommunications Networking, vol. 45, Issue 1, May 2004 (5 pages).

Braden et al., "From Protocol Stack to Protocol Heap—Role-Based Architecture," ACM SIGCOMM Computer Communication Review, vol. 33, Issue 1, pp. 17-22, Jan. 2003 (6 pages).

Van Der Merwe et al., "Dynamic Connectivity Management with an Intelligent Route Service Control Point," Applications, Technologies, Architectures, and Protocols for Computer Communication; Proceedings of the 2006 SIGCOMM Workshop on Internet Network Management, held in Pisa, Italy, pp. 29-34, 2006 (6 pages).

Kaplan, Hadriel, "Part 3 in the Reliability Series, NSR Non-Stop Routing Technology," Avici Systems, Inc., 2002 (8 pages).

Cranor et al., "Gigascope: A Stream Database for Network Applications," International Conference on Management of Data; Proceedings of the 2003 ACM SIGMOD International Conference on Management of Data, held in San Diego, United States, pp. 647-651, 2003 (5 pages).

Patterson et al., "A Case for Redundant Arrays of Inexpensive Disks (RAID)," International Conference on Management of Data; Proceedings on the 1988 ACM SIGMOD International Conference on Management of Data, held in Chicago, United States, pp. 109-116, 1988 (8 pages).

Crowcroft et al., "Plutarch: An Argument for Network Pluralism," Mar. 24, 2003 (11 pages).

Castineyra et al., "The Nimrod Routing Architecture," Network Working Group, Aug. 1996 (27 pages).

(56) References Cited

OTHER PUBLICATIONS

Moy, J., "OSPF Version 2," Network Working Group, Apr. 1998 (204 pages).
Quittek et al., "Requirements for IP Flow Information Export (IPFIX)," Oct. 2004 (31 pages).
Pan et al., "RFCc4090-Fast Reroute Extensions to RSVP-TE for LSP Tunnels," Network Working Group, May 2005 (29 pages).
Rekhter et al., "A Border Gateway Protocol 4 (BGP-4)," Network Working Group, Jan. 2006 (103 pages).
Andersen et al., "Resilient Overlay Networks," ACM SIGOPS Operating Systems Review, vol. 35, Issue 5, pp. 131-145, Dec. 2001 (15 pages).
Shaikh et al., "OSPF Monitoring: Architecture, Design and Deployment Experience," Proceedings of the 1st Conference on Symposium on Networked Systems Design and Implementation, held in San Francisco, United States, vol. 1, 2004 (14 pages).
Yaar et al., "Siff: A Stateless Internet Flow Filter to Mitigate DDoS Flooding Attacks," pp. 130-143 of the Proceedings of Security and Privacy of the 2004 IEEE Symposium held on May 9-12, 2004 (14 pages).
Zhao et al., "Tapestry: A Resilient Global-Scale Overlay for Service Deployment," IEEE Journal on Selected Areas in Communications, vol. 22, No. 1, pp. 41-53, Jan. 2004 (13 pages).
Tennenhouse et al., "Towards an Active Network Architecture," pp. 2-15 of DARPA Active Networks Conference and Exposition, proceedings held in San Francisco, United States, on May 29-30, 2002 (14 pages).
Yang et al., "A DoS-limiting Network Architecture," IEEE/ACM Transactions on Networking (TON), vol. 16, Issue 6, pp. 1267-1280, Dec. 2008 (12 pages).
Braden et al., "Developing a Next-Generation Internet Architecture," Jul. 15, 2000 (21 pages).
Stoica et al., "Chord: A Scalable Peer-to-Peer Lookup Protocol for Internet Applications," IEEE/ACM Transactions on Networking (TON), vol. 11, Issue 1, pp. 17-32, Feb. 2003 (14 pages).
Katabi et al., "Congestion Control for High-Bandwidth-Delay Product Networks," In the Proceedings on ACM SIGCOMM, held in Pittsburgh, United States, on Aug. 19-23, 2002 (14 pages).
Lakshman et al., "The SoftRouter Architecture," Proceedings of the 3rd HotNets SIGCOMM Workshop on Hot Topics in Networks, held in San Diego, United States, on Nov. 15-16, 2004 (6 pages).
Fenner et al., "Protocol Independent Multicast—Sparse Mode (PIM-SM): Protocol Specification (Revised)," RFC 4601, Aug. 2006 (151 pages).
Fenner te al., "Multicast Source Discovery Protocol (MSDP)," RFC 3618, Oct. 2003, (20 pages).
Harrington et al., "An Architecture for Describing Simple Network Management Protocol (SNMP) Management Frameworks," RFC 3411, Dec. 2002 (65 pages).
Meyer et al., "Report from the IAB Workshop on Routing and Addressing," RFC 4984, Sep. 2007 (40 pages).
Rosen et al., "Multiprotocol Label Switching Architecture," RFC 3031, Jan. 2001 (62 pages).
Le Faucheur et al., "Multi-Protocol Label Switching (MPLS) Support of Differentiated Services," RFC 3270, May 2002 (65 pages).
Blake et al., "An Architecture for Differentiated Services," RFC 2475, Dec. 1998 (37 pages).
Andersson et al., "LDP Specification," RFC 3036, Jan. 2001 (133 pages).
"Internet Research Task Force: Routing Research Group," [retrieved from the Internet on Jul. 14, 2010]. Retrieved from the Internet: http://www.irtf.org/charter?gtype=rg&group=rrg, (3 pages).
"Pluris Massively Parallel Routing," Pluris MPR White Paper, [retrieved from the Internet on Jul. 14, 2010]. Retrieved from the Internet: http://www.academ.com/nanog/feb1998/parallel/index.html, Feb. 1998 (12 pages).
Jen et al., "Towards a New Internet Routing Architecture: Arguments for Separating Edges from Transit Core," In Seventh ACM Workshop on Hot Topics in Networks (HotNets-VII), held in Calgery, Alberta, Canada, Oct. 2008 (6 pages).
K. Kobayashi, "Flexible Arrays of Inexpensive Network (FAIN): Toward global parallelism in the Internet to satisfy future traffic growth," In the Proceedings of the 2008 ACM CoNEXT ReArch Workshop, held in Madrid, Spain. Dec. 2008 (6 pages).
Masi et al., "Modeling Internet Service Provider Backbone Networks," Telecommunications Review, pp. 91-103, 2007 (13 pages).
Scheck, Stephen "Net-BGP-0.10," [retrieved from the Internet on Jul. 16, 2010]. Retrieved from the Internet: http://search.cpan.org/~kbrint/Net-BGP-0.10/lib/Net/BGP.pm, (3 pages).
"Configuring Link Bundling on Cisco IOS XR Software," Cisco Systems, Inc., [retrieved from the Internet on Jul. 16, 2010]. Retrieved from the Internet: http://www.cisco.com/en/US/docs/ios_xr_sw/iosxr_r3.2/interfaces/configuration/guide/hc32bund.html, (9 pages).
"Cisco Integrated Routing and Bridging," Cisco Systems, Inc., [retrieved from the Internet on Jul. 16, 2010]. Retrieved from the Internet: http://www.cicso.com/en/US/tech/tk389/tk855/tsd_technology_support_sub-protocol_home.html, (1 page).
"TX Matrix—Central Switching and Routing Element," Juniper Networks, [retrieved from the Internet on: Jul. 16, 2010]. Retrieved from the Internet: http://www.juniper.net/us/en/products-services/routing/t-tx-series/txmatrix/, (1 page).
"Cisco CRS-1 Multishelf System," Cisco Systems, Inc., [retrieved from the Internet on: Jul. 16, 2010]. Retrieved from the Internet: http://www.cisco.com/en/US/products/ps5842/index.html, (1 page).
"The OpenFlow Switch Consortium," [retrieved from the Internet on: Jul. 16, 2010]. Retrieved from the Internet: http://www.openflowswitch.org, (2 pages).
"The BGP Instability Report," [retrieved from the Internet on: Jul. 16, 2010]. Retrieved from the Internet: http://bgpupdates.potaroo.net/instability/bgpupd.html, (5 pages).
Labovitz et al., "Experimental Study of Internet Stability and Wide-Area Backbone Failures," In Proc. International Symposium on Fault-Tolerant Computing, 1998 (22 pages).
"The Netfilter Project," [retrieved from the Internet on: Jul. 16, 2010]. Retrieved from the Internet: http://www.netfilter.org/, (2 pages).
"Avici Composite Links," Avici Systems, [retrieved from the Internet on: Jul. 16, 2010]. Retrieved from the Internet: http://63.111.106.66/technology/composite_links.shtml, (1 page).
"Cisco Visual Networking Index," Cisco Systems, Inc., [retrieved from the Internet on: Jul. 16, 2010]. Retrieved from the Internet: http://www.cisco.com/visualnetworkindex, (15 pages).
Farinacci et al., "Locator/ID Separation Protocol (LISP)," Internet Draft draft-farinacci-lisp-11.txt, Dec. 19, 2008 (58 pages).
Ballani et al., "ViAggre: Making Routers Last Longer!," In NSDI'09: Proceedings of the 6th Conference on Symposium on Networked Systems Design & Implementation, USENIX Association, 2009 (6 pages).
Aggarwal et al., "MPLS Upstream Label Assignment and Context-Specific Label Space," Internet Draft draft-ietf-mpls-upstream-label-07.txt, Jul. 10, 2008 (13 pages).
Eatherton et al., "Tree Bitmap : Hardware/Software IP Lookups with Incremental Updates," ACM SIGCOMM Computer Communications Review vol. 34, No. 2, pp. 97-122, Apr. 2004 (26 pages).
Feamster et at., "Detecting BGP Configuration Faults with Static Analysis," In NSDI'05: Proceedings of the Symposium on Networked Systems Design and Implementation, May 2-4, 2005, Boston, MA, May 2005 (23 pages).
Mahajan et al., "Understanding BGP Misconfiguration," SIGCOMM'02, Aug. 19-23, 2002, Pittsburgh, Pennsylvania, (14 pages).
Zhang et al., "Scaling IP Routing with the Core Router-Integrated Overlay," In ICNP'06: Proceedings of the 2006 IEEE International Conference on Network Protocols, pp. 147-156, Washington, DC, 2006 (10 pages).
Bernaschi et al., "SockMi: a solution for migrating TCP/IP connections," In 15th EUROMICRO International Conference on Parallel, Distributed and Network-Based Processing, Feb. 2007 (5 pages).

(56) References Cited

OTHER PUBLICATIONS

Hagsand et al., "Design and Implementation of a Distributed Router," In 2005 IEEE International Symposium on Signal Processing and Information Technology, pp. 227-232, Dec. 2005 (6 pages).

"Virtual Bridged Local Area Networks," IEEE Standard for Local and metropolitan area networks, IEEE Std 802.1Q-2005, 2005 (303 pages).

United States Non-Final Office Action, issued by the United States Patent Office in connection with U.S. Appl. No. 12/343,707, on Jul. 22, 2010, 23 pages.

United States Non-Final Office Action, issued by the United States Patent Office in connection with U.S. Appl. No. 12/343,719, on Apr. 1, 2010, 24 pages.

United States Non-Final Office Action, issued by the United States Patent Office in connection with U.S. Appl. No. 12/343,735, on Aug. 19, 2010, 21 pages.

United States Final Office Action, issued by the United States Patent Office in connection with U.S. Appl. No. 12/343,719, on Sep. 14, 2010, 25 pages.

United States Patent and Trademark Office, "Notice of Allowance," issued in connection with U.S. Appl. No. 12/786,157 on Nov. 19, 2013, 9 pages.

United States Patent and Trademark Office, "Notice of Allowance," issued in connection with U.S. Appl. No. 13/691,167 on Nov. 7, 2013, 17 pages.

United States Patent and Trademark Office, "Final Office Action," issued in connection with U.S. Appl. No. 12/786,157 on Jun. 26, 2013, 9 pages.

\* cited by examiner

METHODS AND APPARATUS TO ROUTE CONTROL PACKETS BASED ON ADDRESS PARTITIONING

FIELD OF THE DISCLOSURE

This disclosure relates generally to routing and, more particularly, to methods and apparatus to route control packets based on address partitioning.

BACKGROUND

The Internet is composed of an underlying infrastructure and communication protocols operating in conjunction with the infrastructure. The infrastructure can be viewed as a network topology combining links and routers, while the protocols are meta-communication algorithms that facilitate efficient usage of the infrastructure. Protocols may include Internet Protocol (IP), Open Shortest Path First (OPSF), Simple Network Management Protocol (SNMP), Border Gateway Protocol (BGP), Transmission Control Protocol (TCP), and/or Multiprotocol Label Switching (MPLS).

Traditionally, Internet development has focused on the evolution, creation, and/or improvement of the protocols while the infrastructure has received relatively less attention. Because the performance of the infrastructure and the protocols affect each other, neglect of the infrastructure may cause issues to manifest within the protocols. For example, rapid growth in address prefixes associated with the IP version four (IPv4) protocol has created an issue where routing entities (e.g., infrastructure components) are running out of forwarding memory. Currently, solutions to this issue focus on protocol improvements and/or changes including route reflectors and/or the implementation of BGP. In other examples, infrastructure may be improved by deploying new generations of router technology or adding subcomponents to current routers to account for increased loads. However, new generation routers and/or subcomponents may be costly to implement, time consuming to validate, and may require a new communication protocol.

DETAILED DESCRIPTION

Figure 1:
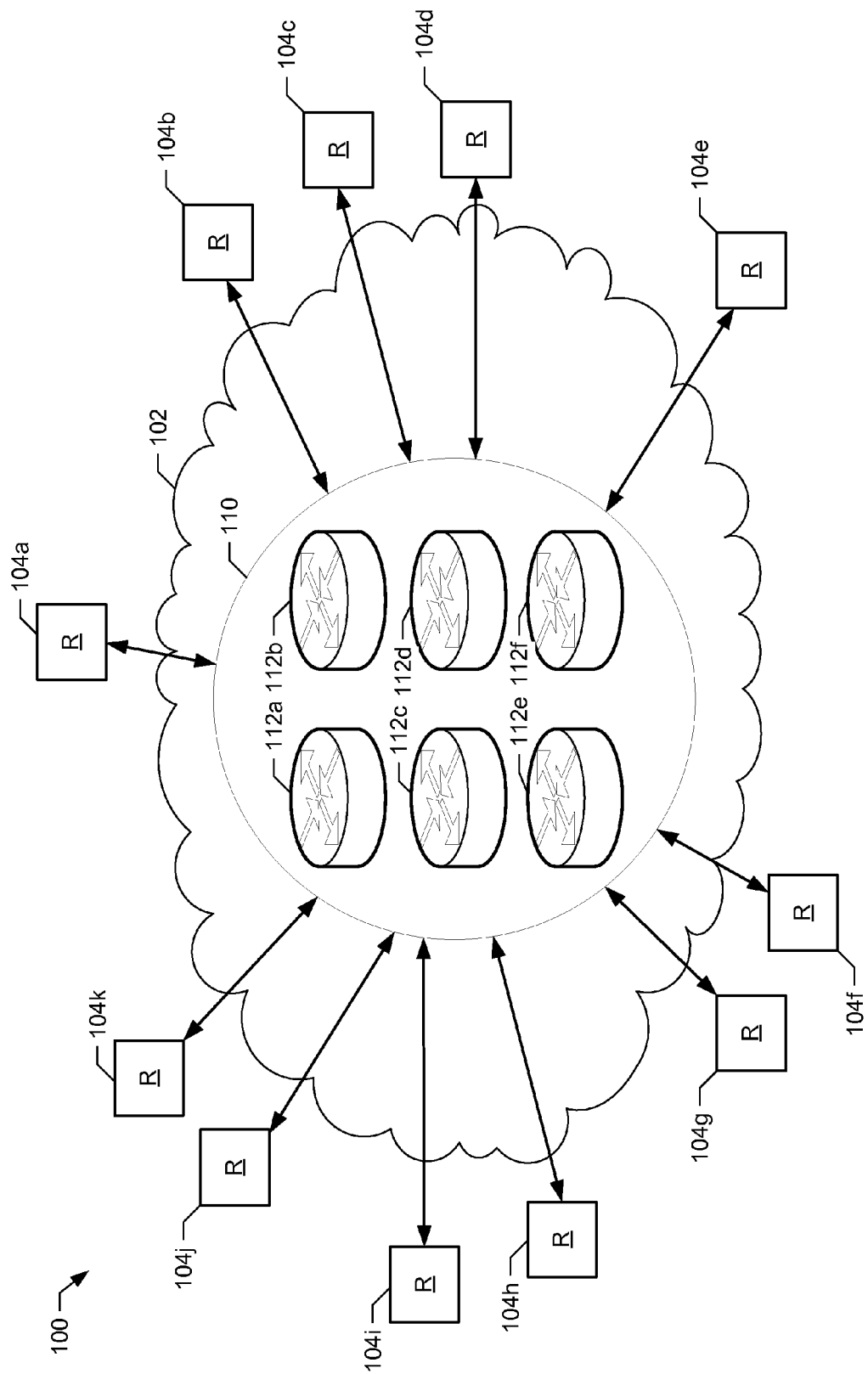
FIG. 1 is a schematic illustration of an example communication system including an example a Router Extensibility via Address-based Partitioning (REAP) router.

Example methods, articles of manufacture, and apparatus to route control packets based on address partitioning are disclosed. A disclosed example method includes receiving a packet in a server, determining the packet is a control packet, forwarding the packet to a processor, and identifying via the processor an address prefix of the packet. The example method also includes accessing a forwarding table and determining via the processor at least one of a router or an outgoing interface that corresponds to the identified address prefix, transmitting the packet from the processor to the server via the outgoing interface, and statically forwarding the packet from the server to the router based on an interface that received the packet from the processor.

A disclosed example apparatus includes a processor to identify an address prefix of a packet, access a forwarding table and determine at least one of a router or an outgoing interface that corresponds to the identified address prefix, and transmit the packet via the outgoing interface. The example apparatus also includes a server to statically forward the packet to the router based on an interface that received the packet from the processor.

A packet communication network (e.g., the Internet) provides connectivity between users and/or enterprises. A relatively small number of users may be communicatively coupled together via a switching device (e.g., a router). However, as the number of users and/or enterprises increases, the switching device may experience capacity issues. These capacity issues may include an availability of interfaces or ports, an end-to-end latency increase of packets propagating through the switching device, an increase in forwarding table size, and/or increases in recovery times due to temporary unavailability of the switch.

To resolve the issues of a single switch, multiple switches and/or network routers at different physical locations may be combined together in a routing network configuration. In this configuration, adjacent routers and/or switches are directly communicatively coupled together. Further, each router and/or switch may directly couple to a subset of users and/or enterprises. Additionally, as data and control planes increase in size to accommodate increases in Internet usage, network infrastructure may be increased by adding subcomponents (e.g., line cards, interfaces, network bundles, etc.) to the routers and/or switches. However, as additional subcomponents are added, the network infrastructure may become more complicated. The network may be further complicated by implementing different protocols to support the subcomponents and/or by implementing management functionality to control the infrastructure components.

In addition to these infrastructure solutions, communication protocols are typically implemented to optimize routing paths and reduce latency with the routing network. In a routing network configuration, end-to-end latency may be minimized based on a routing protocol but processing delays may result from packets propagating through multiple routers (e.g., the infrastructure) to reach a destination. Further, the communication protocols may provide relatively quicker network recovery from temporary outages of one or more routers because the interconnectivity of the network topology facilities re-routing packets around a router and/or link experiencing an issue.

However, quicker recovery times achievable by communication protocols have a tradeoff of an increase in network management and complexity. In addition, communication protocols have become more complex to manage and optimize the routing network. Furthermore, with many different users and routers within the network, forwarding table sizes may be relatively large to accommodate the many routers, users, and/or enterprises. Additionally, forwarding table sizes have increased with the frequent use of multihoming to route packets.

The example methods, articles of manufacture, and apparatus described herein provide scalability of a communication network by implementing a REAP router. An example REAP router enables scalability and/or complexity management of a core router by using a logical switch and/or a router with multiple physical switches (e.g., routers). The logical switch includes multiple physical switches (e.g., routers), where any physical switch may take over a state (e.g., address subspace) of any other switch within the logical switch. The example REAP router scales infrastructure for managing data and control planes by managing router subcomponents as a single logical router. Each of the subcomponents may include routers within a router array with each router partitioned a subspace of an address space assigned to the REAP router. Each of the routers (e.g., subcomponents) within the REAP router perform control, data, and/or management plane functions.

Additionally, the example REAP router includes a splitter and/or a meta-router to route data and/or control packets to a physical router within the router array based on an address prefix and/or destination address associated with the packets. In this manner, each of the physical routers within the router array perform data, control, and/or management functions for only packets associated with the address subspace assigned to the physical routers. Furthermore, interfaces and/or forwarding tables (independent of a network protocol) may be distributed among the physical switches and/or routers enabling relatively better scalability than a core router. Because forwarding tables are distributed among the physical routers such that each physical router is partitioned into a subspace or a portion of the entire address space, the forwarding table size stored at each router is reduced.

The example REAP router described herein manages control and/or data packet flow among physical array routers via a splitter and/or a meta-router. The example splitter (e.g., a server) may receive packets from external routers (e.g., routers external to the REAP router), determine if the packets correspond to control or data packets, and forward the packets to the appropriate location. For example, the splitter may forward control packets to the meta-router (e.g., a processor). The example meta-router may access a forwarding table, determine a destination of the control packet (e.g., a physical router within the router array), and forward the control packet to an appropriate physical router via an interface of the splitter. The example meta-router may also manage the address subspace distribution among the physical routers within the router array. In another example, the splitter may determine packets are data packets. In this example, the splitter may access a forwarding table and determine to which array router the packets are to be forwarded. The splitter may then forward those packets to the physical router within the router array.

The corresponding physical router may perform data plane operations on the data packets to select an outgoing interface that corresponds to a next-hop and/or a destination of the packet. The physical router may transmit the data packets through an interface to the splitter, which then statically forwards the packet to the destination and/or next-hop router. In this manner, the example splitter may effectively or efficiently route traffic based on forwarding decisions made by the physical router within the router array while minimizing forwarding table sizes of each physical router.

The example REAP router may extend the shelf life of currently deployed routers by decoupling core router extensibility from specific router architecture improvements. In other words, the example REAP router provides infrastructure scalability without having to upgrade hardware and/or software to accommodate new protocols and/or increases in network load. By using standardized protocols, the physical routers within a router array may be viewed by a network as black boxes with well-defined interfaces. As a result, individual physical routers within the array may be replaced with secondary or backup routers without affecting external routers.

In the interest of brevity and clarity, throughout the following disclosure, reference will be made to an example communication system 100 of FIG. 1. However, the methods, articles of manufacture, and apparatus described herein to route packets in a network are applicable to other types of networks constructed using other network technologies, topologies and/or protocols. Protocols may include Internet Protocol (IP), Open Shortest Path First (OPSF), Simple Network Management Protocol (SNMP), Border Gateway Protocol (BGP), Transmission Control Protocol (TCP), and/or Multiprotocol Label Switching (MPLS).

FIG. 1 illustrates the example communication system 100 that is implemented in connection with a switching network 102 (e.g., the Internet). The example switching network 102 may include any type of network for routing packet-based communications (e.g., data). The switching network 102 may be implemented by any type of public switched telephone network (PSTN) system(s), public land-mobile network (PLMN) system(s), wireless distribution system(s), wired or cable distribution system(s), coaxial cable distribution system(s), fiber-to-the-home network(s), fiber-to-the-curb network(s), fiber-to-the-pedestal network(s), fiber-to-the-vault network(s), fiber-to-the-neighborhood network(s), Ultra High Frequency (UHF)/Very High Frequency (VHF) radio frequency system(s), satellite or other extra-terrestrial system(s), cellular distribution system(s), power-line broadcast system(s), and/or combinations and/or hybrids of these devices, systems and/or networks.

The example switching network 102 is communicatively coupled to external routers 104a-k that may be included within other switching networks and/or associated with users and/or enterprises (e.g., clients). The example external routers 104a-k may be packet-based switches such as, for example, the Catalyst 3000 and/or 5000 series of switches from Cisco Systems, Inc. Some of the external routers 104a-k may communicatively couple the example switching network 102 to other switching networks and/or to users. Additionally, the example external routers 104a-k may be communicatively coupled to a gateway (e.g., a modem) providing a network interface for customer premises equipment (e.g., a computer, a Voice over IP (VoIP) phone, a laptop, etc.).

To route packets from the external routers 104a-k, the example switching network 102 includes a REAP router 110. The example REAP router 110 provides packet routing for regions including relatively small regions (e.g., tens of square miles) to relatively large regions (e.g., a few hundred square miles) that typically may be managed by a core router. The external routers 104a-k of FIG. 1 may be communicatively coupled to the logical REAP router 110 via any wired and/or wireless communication medium (e.g., a Wide Area Network (WAN), a Local Area Network (LAN), a Virtual Private Network (VPN), a Virtual LAN (VLAN), Wireless LAN (WLAN) network, etc.). In other examples, the communication system 100 may include fewer or more external routers 104a-k communicatively coupled to the REAP router 110.

The example REAP router 110 is a logical router that includes an array of physical routers 112a-f. In other examples, the REAP router 110 may include fewer or more physical routers. The physical routers 112a-f are organized within the REAP router 110 so that each physical router 112a-f is assigned an address subspace for routing packets. For example, the REAP router 110 may be responsible for routing packets among the external routers 104a-k. In this example, the physical router 112a may be assigned an address subspace that corresponds to the external routers 104a-c. Thus, packets and/or traffic with a header that specifies a destination that is reachable via the external routers 104a-c are directed by the REAP router 110 to the physical router 112a. The physical router 112a may then access a forwarding table to determine an appropriate interface so that packets and/or traffic are routed to the external routers 104a-c.

By partitioning destination address subspace among the physical routers 112a-f, the forwarding tables within the physical routers 112a-f may include fewer entries. Fewer entries in a forwarding table may result in less memory and lookup time for packet routing by the physical routers 112a-f. In some examples, the REAP router 110 may manage the address subspace assigned to the physical routers 112a-f so that the address subspace assigned to each physical router 112a-f may be adjusted based on load, redundancy, and/or fault protection. Because the physical routers 112a-f are located at the same physical location within the REAP router 110, network management and failsafe backup operations may be performed relative quickly and efficiently.

Figure 2A:
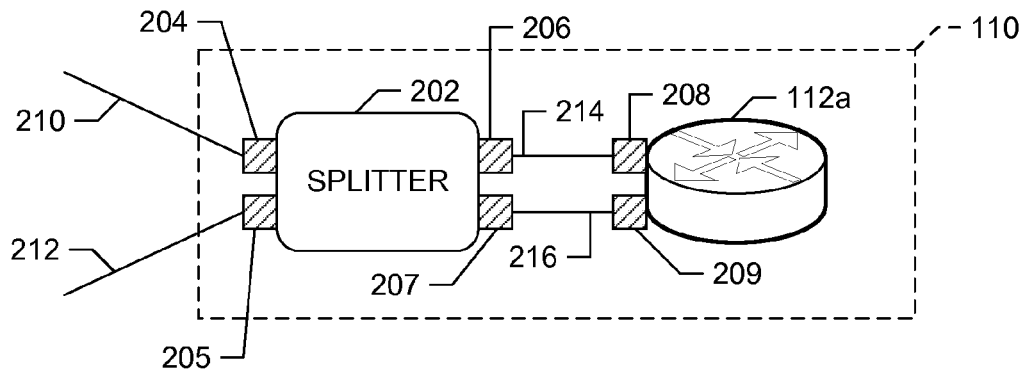
FIGS. 2A-2C illustrate an example manner of implementing the example REAP router of FIG. 1.
Figure 2B:
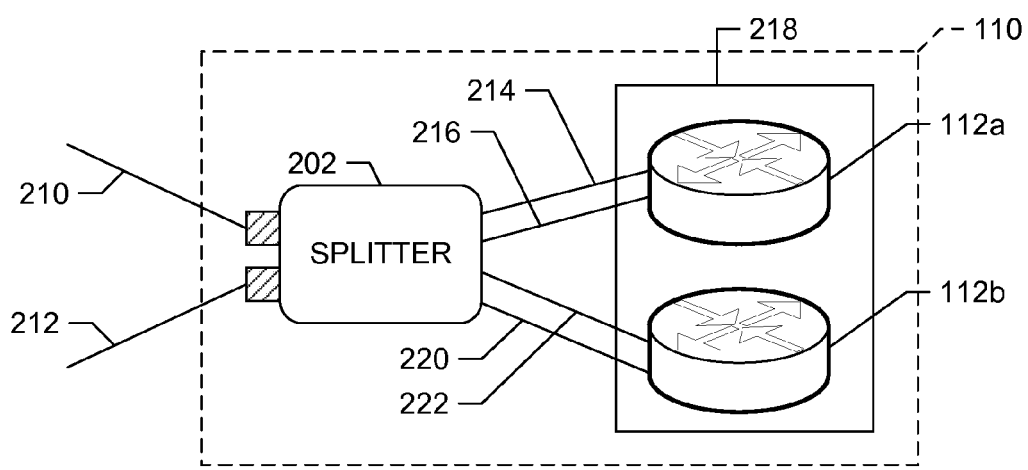
Figure 2C:
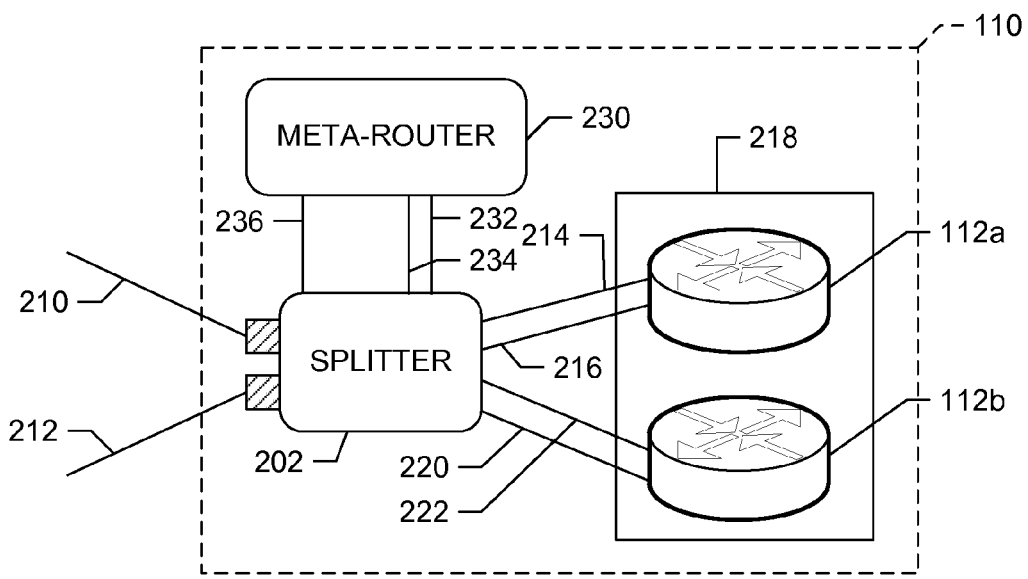

FIGS. 2A-2C illustrate an example manner of implementing the example REAP 110 router of FIG. 1 for different network planes. FIG. 2A shows a configuration of interfaces 204-209 between a splitter 202 and the physical router 112a. The physical router 112a may be located within a routing array. In this example, a communication link 210 is coupled to the interface 204 and a communication link 212 is coupled to the interface 205. Additionally, a communication link 214 communicatively couples the interface 206 of the splitter 202 to the interface 208 of the router 112a. Similarly, a communication link 216 communicatively couples the interface 207 of the splitter 202 to the interface 209 of the router 112a. The example communication links 210-216 may be implemented by any wired and/or wireless communication path (e.g., Ethernet, IEEE-802.11, Wi-Fi®, IEEE 1901.1, etc.).

The example in FIG. 2A shows that the external communication links 210 and 212 correspond to the respective internal communication links 214 and 216. Specifically, the external communication link 210 corresponds to the internal communication link 214 to form a first interface set and the external communication link 212 corresponds to the internal communication link 216 to form a second interface set. The example REAP router 110 is configured so that any incoming or outgoing packets traverse the communication links within the same interface set with switching between the interfaces sets occurring at the physical routers (e.g., the physical router 112a) within a router array.

For example, incoming packets to the REAP router 110 propagating along the communication link 210 are statically forwarded by the splitter 202 to the physical router 112a via the communication link 214. The example splitter 202 determines that the packets arrived via the interface 204 and forwards the packets to the router 112a via the interface 206 that corresponds to the communication link 214. In a similar manner, the splitter 202 forwards packets received from the physical router 112a to the external network based on an interface that received the packet. For example, the physical router 112a may receive packets, access a forwarding table to determine an outgoing interface (e.g., the interface 209) to route the packets, and transmit the packets along the communication link 216. The splitter 202 receives the packets via the interface 207 and statically forwards the packets via the interface 205 to the external communication link 212 and a next-hop external router. In this manner, the splitter 202 of FIG. 2A effectively routes packets based on forwarding decisions made by external routers and/or the physical router 112a.

FIG. 2B shows a data plane implementation of the example REAP router 110 of FIG. 1. In this example, the physical routers 112a-b are located within a router array 218. While the router array 218 shows the physical routers 112a-b, the router array 218 may include additional physical routers (e.g., the physical routers 112c-f). Further, each of the example routers 112a-b may be assigned or partitioned a different address subspace. Additionally, communication links 220 and 222 communicatively couple the physical router 112b to the splitter 202. For clarity and brevity, the internal interfaces of the splitter and the routers 112a-b are not shown.

The example splitter 202 shown in FIGS. 2A-2C may include a server, a switch, a router, and/or a processor. The splitter 202 includes a forwarding table that may group entries based on address subspaces allocated among physical routers (e.g., the physical routers 112a-b) within the router array 218. In some examples, the size of the forwarding table may be bounded by a number of address blocks partitioned among the physical routers 112a-b, which may be orders of magnitude less than forwarding table sizes in typical network routers. Because the splitter 202 is a point of distribution for data and control packets, the forwarding table and/or interfaces of the splitter 202 may scale linearly based on the number of physical routers within the router array 218. In some examples, the splitter 202 may utilize virtual links over physical links to reduce the number of physical ports required. Also, because the splitter 202 is the point of distribution for received packets into the REAP router 110, the splitter 202 may become a packet forwarding time bottleneck. In these instances, multiple splitters may be implemented in parallel to distribute the routing to the router array 218 as described in conjunction with FIG. 5.

In the data plane configuration shown in FIG. 2B, the communication link 220 is added to the first interface set that includes the communication links 210 and 214. Additionally, the communication link 222 is added to the second interface set that includes the communication links 212 and 216. Thus, packets received by the splitter 202 via the communication link 210 may be routed by the splitter 202 to either the communication link 220 or 214 depending on an address prefix and/or destination address of the packets. Likewise, packets received by the splitter 202 via the communication link 212 may be routed by the splitter 202 to either of the communication link 222 or 216 depending on an address prefix and/or destination address of the packets.

For example, the REAP router 110 may route packets for an address space of A+B. The physical router 112a may be assigned an address subspace A and the physical router 112b may be assigned to an address subspace B. If the packets received by the splitter 202 via the communication link 212 have an address prefix and/or a destination address that corresponds to the address subspace B, the splitter 202 accesses a forwarding table and determines that the packets are to be forwarded to the physical router 112b via the communication link 222. Similarly, if the packets corresponding to the address subspace B are received by the splitter 202 via the communication link 210, the splitter 202 may forward the packets to the physical router 112b via the communication link 220.

However, packets received by the splitter 202 from the physical routers 112a-b are statically forwarded to an external router via either of the communication links 210 and/or 212 based on an interface (e.g., communication link) of the splitter 202 that received the packets. For example, packets transmitted by the physical router 112a to the splitter 202 via the communication link 214 are statically forwarded by the splitter 202 to the external communication link 210 because the communication links 210 and 214 are within the same interface set. In this manner, routing decisions made by the routers 112a-b are carried through the splitter 202 to the external network.

FIG. 2C shows a control plane implementation of the example REAP router 110 of FIG. 1. To distribute control messages and/or packets among the physical routers 112a-b, the example REAP router 110 includes a meta-router 230. The example meta-router 230 enables the physical routers 112a-b to operate dynamic routing protocols and maintain address subspaces by facilitating communication between the routers 112a-b and external network routers. The example meta-router 230 may be implemented by any processor, server, and/or router.

The example meta-router 230 may route control packets based on address prefixes advertised within a message payload of the control packets. For example, BGP control packets may describe advertised routes in a Network Layer Reachability Information (NLRI) field. In some examples, the meta-router 230 may be configured to route and/or forward control packets based on fixed-prefix length for Quality of Service (QoS) operations. In these examples, the physical routers 112a-b within the router array 218 may be configured for routing data packets based on variable-prefix length and/or access control lists. These physical routers 112a-b may also perform Netflow sampling, QoS policing, and/or support multicast functionality. In other examples, the meta-router 230 may route control packets to the physical routers 112a-b based on a destination network address within a header of the packets.

The example meta-router 230 routes control packets for the physical routers 112a-b within the router array 218 to maintain routing and forwarding states organized by address subspaces assigned to each of the routers 112a-b. By routing control packets to an appropriate physical router, the example meta-router 230 ensures that the physical routers 112a-b are responsible for an address subspace. The meta-router 230 may also monitor a status of the physical routers 112a-b and adjust address subspaces based on router traffic loads, router maintenance, router inoperability, redundancy, and/or any other event that may affect the operation of a physical router.

The example meta-router 230 receives control packets from the splitter 202. The splitter 202 may receive packets from external routers via the communication links 210 and 212 and determine if the packets are data or control packets. The splitter 202 may determine the type of packet based on information within a header and/or payload of a packet. In other examples, a packet may be labeled as a control and/or a data packet. The splitter 202 forwards data packets to the physical routers 112a-b and forwards control packets to the meta-router 230.

Upon receiving a control packet from the splitter 202, the example meta-router 230 inspects the packet for address and/or route information. The meta-router 230 may identify address prefix information within a payload of the packet and/or may identify a destination address within a header of the packet. Upon identifying this information, the meta-router 230 accesses a forwarding table to determine a physical router (e.g., the physical routers 112a-b) and/or an outgoing interface to which the control packet is to be routed. The forwarding table may cross-reference a destination address and/or an address prefix to a specific physical router within the router array 218 and/or an outgoing interface. The example meta-router 230 then selects the outgoing interface corresponding to the information associated with the packet and transmits the packet to the splitter 202 via the outgoing interface. The splitter 202 then statically forwards the packet to the appropriate physical router.

In the example of FIG. 2C, the meta-router 230 is communicatively coupled to the splitter 202 via communication links 232-236. These communication links 232-236 may be included within the first interface set. For clarity and brevity, communication links associated with the second interface set are not shown. The communication link 236 may propagate packets from the splitter 202 to the meta-router 230 and the communication links 232 and 234 may propagate packets from the meta-router 230 to the splitter 202. The control packets received by the splitter 202 via the communication link 210 are forwarded to the meta-router 230 via the communication link 236 because the communication links 210 and 236 are part of the same interface set. Additionally, the communication link 232 corresponds to the communication link 214 so that any packets received by the splitter 202 via the communication link 232 are statically forwarded by the splitter 202 to the physical router 112a via the communication link 214. In this manner, control packet routing decisions made by the meta-router 230 are propagated by the splitter 202. Similarly, the communication link 234 may correspond to the communication link 222 so that any packets received by the splitter 202 via the communication link 234 are statically forwarded to the physical router 112b via the communication link 222.

Additionally, control packets received by the splitter 202 from the physical routers 112a-b via the communication links 214 and 222 are statically forwarded by the splitter 202 to the meta-router 230 via the respective communication links 232 and 234. The meta-router 230 may then route the control packets to an external router via the splitter 202 by selecting an appropriate interface and/or communication link to the splitter (e.g., the communication links 236). By configuring the meta-router 230 to receive only control packets, the communication links between the splitter 202 and the meta-router 230 may be relatively lower capacity links compared to higher capacity communication links (e.g., the communication links 214-222) to accommodate relatively higher traffic of data packets.

Figure 3:
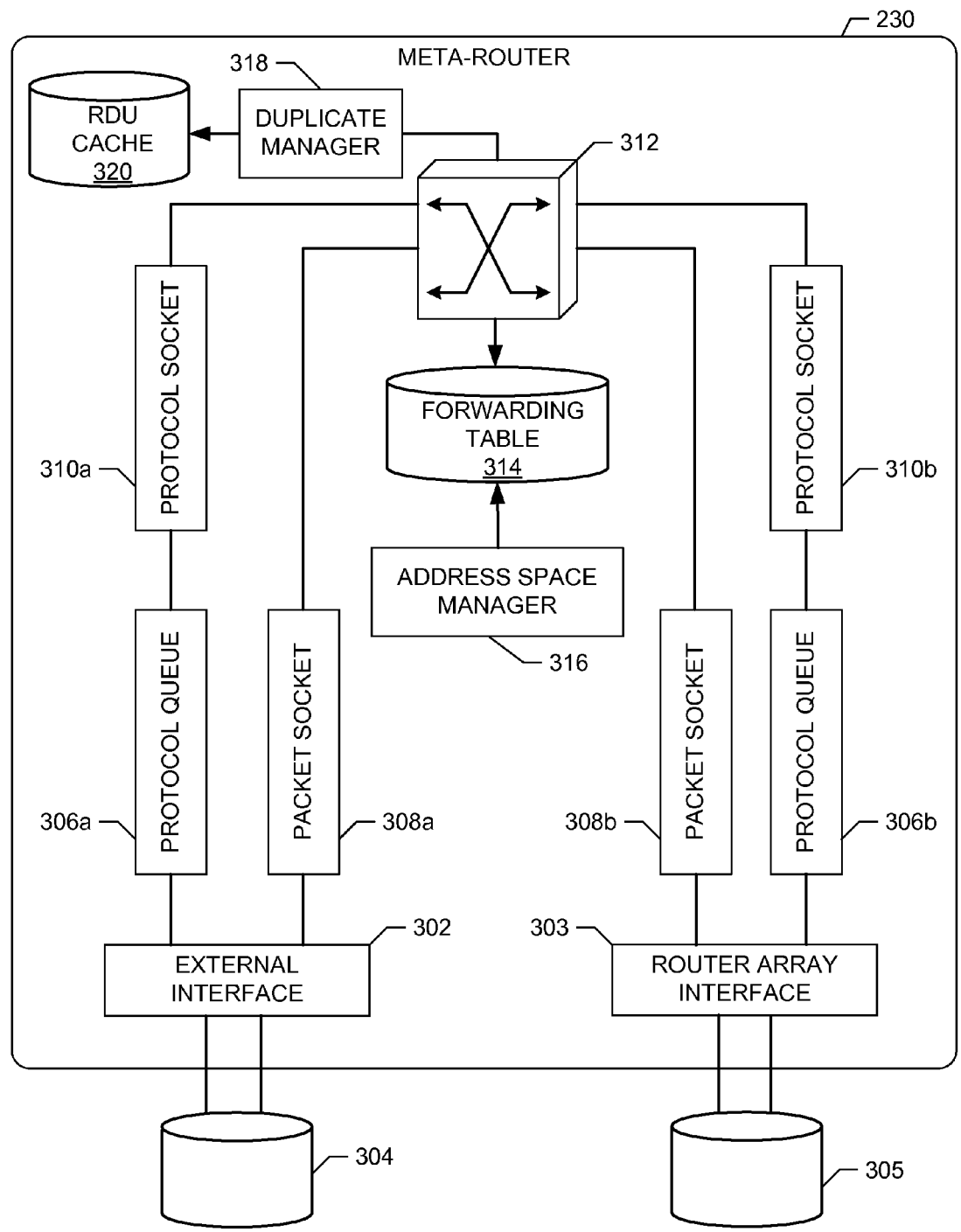
FIG. 3 illustrates a functional block diagram of an example meta-router that may be included within the REAP router of FIGS. 1, 2A, 2B, and/or 2C.

FIG. 3 illustrates a functional block diagram of the example meta-router 230 of FIG. 2C. The example meta-router 230 configures and manages a control plane of the REAP router 110 of FIGS. 1-2C. The example meta-router 230 also routes control packets to appropriate routers (e.g., the physical routers 112a-f of FIG. 1) within the router array 218. The meta-router 230 enables the routers 112a-f within the router array 218 to function as though the routers 112a-f are directly connected to external routers (e.g., the external routers 104*a-k*) by preserving source and destination addresses of control messages. By having the routers 112*a-f* configured as though they are directly connected to an external network, the example meta-router 230 reduces the likelihood of misconfigurations among the routers 112*a-f* because the routers 112*a-f* may not need to be configured specifically for the REAP router 110. Furthermore, the example meta-router 230 may reduce and/or eliminate a need for each of the routers 112*a-f* within the router array 228 to perform packet payload network reachability address translation. For example, a local subnet advertised by the OSPF protocol may include an intended prefix that the example meta-router 230 may use for routing control packets. While the example meta-router 230 is shown implementing BGP using TCP as an underlying multi-hop transport protocol and OSPF using IP multicast and/or unicast packets as the underlying transport protocol, the example meta-router 230 may be implemented using any Internet, network, transport, and/or communication protocol.

To receive control packets originating from an external router, the example meta-router 230 of FIG. 3 includes an external interface 302. The example interface 302 is communicatively coupled to a communication link bundle 304 that communicatively couples the external interface 302 to the splitter 202 of FIGS. 2A-2C. The communication link bundle 304 may include the communication link 236 of FIG. 2C and/or other communication links to the splitter 202. The communication link bundle 304 may be implemented by any wired and/or wireless communication medium.

Additionally, to receive control packets originating from physical routers (e.g., the physical routers 112*a-f*) within the router array 218, the example meta-router 230 of FIG. 3 includes a router array interface 303. The example router array interface 303 is communicatively coupled to a communication link bundle 305 that communicatively couples the router array interface 303 to the splitter 202 of FIG. 2. The communication link bundle 305 may include the communication links 232 and 234 of FIG. 2C and/or other communication links to the splitter 202. Further, the communication link bundle 305 may be implemented by any wired and/or wireless communication medium.

The example interfaces 302 and 303 include interfaces for each communication link coupled to the meta-router 230 via the respective communication link bundles 304 and 305. In other examples, each of the interfaces 302 and 303 may include a single interface for the communication links within the respective communication link bundles 304 and 305. The example interfaces 302 and 303 receive control packets and determine a protocol associated with the control packets. If the control packets are associated with a connection-oriented communication protocol (e.g., BGP), the example interfaces 302 and 303 route the packets to respective protocol queues 306*a-b*. However, if the control packets are associated with a connectionless communication protocol (e.g., OSPF protocol), the interfaces 302 and 303 route the control packets to respective packet sockets 308*a-b*. The interfaces 302 and 303 may identify a protocol of a packet based on information within a payload of the packet, information within a header of the packet, and/or based on a format of the packet. In other examples, the interfaces 302 and 303 may route control packets to other functional blocks for other types of communication protocols.

The example protocol queues 306*a-b* of FIG. 3 translate source and/or destination addresses of control packets associated with a connection-oriented communication protocol so that the control packets may be routed within the meta-router 230. Typically, connection-oriented communication protocols such as, BGP, use loopback communications to establish connections between peer routers (e.g., a physical router and an external router). These loopback communications may ensure that peering sessions remain active and/or open as long as at least one path is available between an external router and a physical router within the router array 218. Additionally, the example protocol queues 306*a-b* provide address translation because the meta-router 230 functions as a proxy between external routers and internal physical array routers. Without address translation, control packets received by the meta-router 230 may not be routed out of the meta-router 230 because the meta-router 230 may have the same destination address as the routers within the router array 218.

To translate control packet source and/or destination addresses, the example protocol queues 306*a-b* identify a source and/or destination address within a header of a control packet. The protocol queues 306*a-b* then assign a new address to the source and/or destination address based on a representation of the meta-router 230 of the source and/or destination address. The example protocol queues 306*a-b* may also translate address prefixes included within a payload of control packets. The protocol queues 306*a-b* may include a table that stores a list of addresses cross-referenced to the meta-router 230 representation of the addresses. An address based on a representation of the meta-router 230 is an address that corresponds to a physical router and/or an external router but may be only visible and/or addressable within the meta-router 230.

In an example, the protocol queue 306*b* may receive a control packet originating from the physical router 112*a* within the router array 218. The protocol queue 306*b* translates the source address of the packet from 1.1.1.9 to 3.3.3.9 and translates the destination address of the packet from 1.1.1.10 to 3.3.3.10. The destination may correspond to the external router 104*k*. The protocol queue 306*b* then forwards the packet for routing within the meta-router 230. The example protocol queue 306*a* may then receive the packet after the meta-router 230 has specified an outgoing interface for the packet. The protocol queue 306*a* re-translates the packet to have the original source and destination address (e.g., 1.1.1.9 and 1.1.1.10) prior to forwarding the packet to the external interface 302. In this manner, the example protocol queues 306*a-b* mask the presence of the meta-router 230 so that the physical router 112*a* and the external router 104*k* operate as if they are directly communicatively coupled.

Further, the protocol queues 306*a-b* may aggregate control packets with similar destination and/or source addresses so that the meta-router 230 can perform routing on a group of similar packets. The protocol queues 306*a-b* may aggregate packets for a time period and/or for a predefined number of packets prior to transmitting an aggregated group of packets. Upon aggregating and/or translating control packets, the protocol queues 306*a-b* forward the control packets to respective protocol sockets 310*a-b*.

The example protocol sockets 310*a-b* receive control packets from the respective protocol queues 306*a-b* and prepare the control packets for routing within a switch fabric 312. The example protocol sockets 310*a-b* may be configured to operate on packets associated with a connection-oriented communication protocol. In some examples, the protocol sockets 310*a-b* may separate source and/or destination addresses of the packet from a payload of the packet and forward the separated components to the switch fabric 312 and/or a management application operating through the switch fabric 312. Alternatively, the packet sockets 310*a-b* may identify an address prefix within a payload of a control packet and forward the address prefix and the packet to the switch fabric 312 for routing.

In addition to receiving packets from the protocol queues 306a-b, the protocol sockets 310a-b may receive packets from the switch fabric 312. The switch fabric 312 may identify an outgoing interface to route a control packet and select a socket within the protocol sockets 310a-b that corresponds to the selected outgoing interface. The protocol sockets 310a-b then forward the control packets to the appropriate outgoing interface within the respective interfaces 302 and 303.

The example packet sockets 308a-b of FIG. 3 receive and prepare control packets associated with connectionless communication protocols (e.g., OSPF protocol). Additionally, the packet sockets 308a-b may translate addresses of the control packets similar to the operation of the protocol queues 306a-b. Because the communication state may not be kept explicitly within sockets of the meta-router 230, the packet sockets 308a-b are directly communicatively coupled to the respective interfaces 302 and 303. The example packet sockets 308a-b may bridge network layer-2 to layer-3 so that multicast control packets associated with broadcast networks (e.g., Ethernets) may be routed within the meta-router 230.

In some examples, the packet sockets 308a-b may separate source and/or destination addresses of the packet from a payload of the packet and forward the separated components to the switch fabric 312 and/or a management application operating through the switch fabric 312. Alternatively, the packet sockets 308a-b may identify an address prefix within a payload of a control packet and forward the address prefix and the packet to the switch fabric 312 for routing.

In addition to receiving packets from the interfaces 302 and 303, the packet sockets 308a-b may receive packets from the switch fabric 312. The switch fabric 312 may identify an outgoing interface to route a control packet and select a socket within the packet sockets 308a-b that corresponds to the selected outgoing interface. The packet sockets 308a-b may then transfer the packets from the network layer-3 to the network layer-2 and forward the control packets to the appropriate outgoing interface within the respective interfaces 302 and 303.

To route control packets to an appropriate physical router (e.g., the physical routers 112a-f of FIG. 1), the example meta-router 230 of FIG. 3 includes the switch fabric 312. The example switch fabric 312 routes the control packets on a routing data unit (RDU) level, where each RDU may describe and/or correspond to address blocks representing an address subspace. For example, an RDU for the OSPF protocol may describe a portion of an address space topology (e.g., an address subspace) and/or a destination network prefix. In another example, an RDU for the BGP may describe a portion of an address space topology as part of an AS path with a NLRI prefix.

Upon receiving control packet(s) from the packet sockets 308a-b and/or the protocol sockets 310a-b, the example switch fabric 312 accesses a forwarding table 314 to identify a physical router and/or an outgoing interface to transmit the packet(s). The example forwarding table 314 includes entries that partition an address space into subspaces that are assigned to physical routers (e.g., the physical routers 112a-f). The forwarding table 314 may be implemented by Electronically Erasable Programmable Read-Only Memory (EEPROM), Random Access Memory (RAM), Read-Only Memory (ROM), and/or any other type of memory.

The example switch fabric 312 may access a forwarding list within the forwarding table 314 and cross-reference a destination address provided by the sockets 308a-b and/or 310a-b to a physical router and/or an outgoing interface. In other examples, the switch fabric 312 may use advertised network prefixes provided by the sockets 308a-b and/or 310a-b to identify a physical router and/or an outgoing interface. In other examples, the switch fabric 312 may determine an outgoing socket for the control packets based on address information (e.g., a network prefix and/or a destination address). Upon identifying an outgoing interface and/or physical router, the example switch fabric 312 identifies a socket associated with the outgoing interface and/or the physical router. The socket may be included within the packet sockets 308a-b and/or the protocol sockets 310a-b based on a protocol associated with the control packets. In some examples, a socket may correspond to and be communicatively coupled to an outgoing interface. The switch fabric 312 then transmits the control packets to the appropriate socket, which then forwards the packet to the corresponding outgoing interface (e.g., an interface within the external interface 202 and/or the router array interface 303). In other examples, a socket may statically forward the packet to the interface 302 and/or 303, which then selects the appropriate outgoing interface.

To manage address subspaces assigned to the physical routers within the router array 218, the example meta-router 230 of FIG. 3 includes an address space manager 316. The address space manager 316 may receive control plane information via the sockets 308a-b and/or 310a-b. In other examples, the address space manager 316 may receive control plane information from a REAP router 110 administrator. The address space manager 316 may reduce the number of meta-routing entries within the forwarding table 314 by assigning contiguous blocks of prefixes of substantially the same length to the physical routers within the router array 218. Additionally, the example address space manager 316 may simplify data structures and routing computation performed by the switch fabric 312.

In some examples, the address space manager 316 may distribute address subspace relatively evenly among physical routers in the router array 218. In other examples, the address space may be divided into relatively equal address subspace blocks. The address space manager 316 may use an algorithm (e.g., a greedy heuristic algorithm) so that address blocks with the highest loads are distributed evenly among the physical routers within the router array 218. The address space manager 316 may use the algorithm until all of the address subspaces are assigned to at least one physical router.

In other examples, the address space manager 316 may calculate a ratio of address blocks to a number of physical routers. A relatively large ratio may result in a relatively lower load imbalance among the physical routers. In another example, the address space manager 316 may minimize a standard deviation of load imbalance among the physical routers by analyzing the ratio of ratio of address blocks to physical routers. For example, calculations may show that load imbalance is minimized when a number of address blocks assigned to physical routers in a router array 218 is eight times a number of physical routers. In yet another example, the address space manager 316 may analyze data packet loads on the physical routers for a time period (e.g., a day, a week, a month, etc.). The packet traffic at each router during the time period may be measured using a Netflow application that forwards the data to the address space manager 316. The address space manager 316 may then redistribute the address blocks among the physical routers based on the measured load.

The example address space manager 316 assigns address subspace blocks to the physical routers in a router array 218 by defining a list in the forwarding table 314 that specifies an address subspace for each physical router. In addition to load balancing, the address space manager 316 may also modify address subspaces in instances where a physical router becomes inoperable. A physical router may become inoperable from regular maintenance, software upgrades, hardware upgrades, addition of subcomponents, broken communication links, and/or any other activity that may cause a physical router to stop routing packets. Upon identifying an inoperable physical router, the example address space manager 316 may repartition address subspaces so that blocks assigned to the inoperable router are reassigned to operable physical routers within the router array 218.

The example address space manager 316 of FIG. 3 may also store configuration information associated with the meta-router 230. The configuration information may include definitions specifying which sockets are assigned and/or configured to certain protocols (e.g., the protocol sockets 310a-b assigned to the BGP). The configuration information may also include socket, interface, and/or communication link information. For example, the address space manager 316 may specify that the communication link 236 of FIG. 2C is communicatively coupled to a particular interface within the external interface 202, which is communicatively coupled to a particular socket within the protocol socket 310a. An example of configuration information associated with a physical router (e.g., the physical router 112a) that may be stored and/or managed by the address space manager 316 is shown below.

110. Lines 9 and 10 may define and/or specify an address of the address space manager 316 that control information may be forwarded for managing the meta-router 230. Further, lines 11-13 may indicate information for managing a physical router within the router array 218 and/or the splitter 202. Lines 14 and 15 may specify addresses assigned to an interface corresponding to a physical router. Line 16 may indicate the address blocks assigned to the address subspace of the physical router. Additionally or alternatively, the configuration information may include more or fewer instructions based on a configuration of the meta-router 230 with physical routers within the router array 218.

To manage failure recovery and/or redundancy among physical routers within the router array 218, the example meta-router 230 of FIG. 3 includes a duplicate manager 318. The example duplicate manager 318 copies control packets routed by the switch fabric 312. If one of the physical routers becomes inoperable and/or a secondary router is assigned to backup a primary physical router, the example duplicate manager 318 sends a copy of the appropriate control packets to the secondary and/or replacement router. In this manner, the replacement router only needs to obtain control plane information from the meta-router 230 instead of sending control plane requests to external routers. The duplicate manager 318 may store a copy of the control packets in an RDU cache 320. The example RDU cache 320 may be implemented by EEPROM, RAM, ROM, and/or any other type of memory. The duplicate manager 318 is further described below in conjunction with FIGS. 6A and 6B.

While an example manner of implementing the meta-router 230 is depicted in FIG. 3, one or more of the interfaces, data structures, elements, processes and/or devices illustrated in FIG. 3 may be combined, divided, rearranged, omitted, eliminated and/or implemented in any

| Line | Configuration Information |
|---|---|
| 1. | System Wide |
| 2. | REAP-interface-set 19029:eth4/3.10.49320: eth1.20,29301:eth2/0,49320:eth1.21 |
| 3. | REAP-interface-set 19029:eth4/3.10.49320: eth1.20,21121:eth2/0.40,49320:eth1.22 |
| 4. | Loopback 2.2.2.10 |
| 5. | Connected_Interface 19029:eth4/5,29301:eth2/0 |
| 6. | Address_Bits 2 |
| 7. | Router_ID 29301 |
| 8. | Router_Type arrayrouter |
| 9. | Daemon_Port 9001 |
| 10. | Daemon_Addr 135.207.11.116 |
| 11. | Router_Man_Int eth0/0:135.207.11.72:255.255.255.192 |
| 12. | Username xxxxxx |
| 13. | Password xxxxxx |
| 14. | Loopback 2.2.2.10, 3.2.0.100 |
| 15. | Router_Int eth2/0:40.40.41.2:255.255.255.0:1.1.5.2:255.255.255.252 |
| 16. | Address_blocks 0,2,3 |

In this example, line 1 may indicate the configuration information applies to the entire REAP router 110. Lines 2 and 3 may define interface set communication links (e.g., the first interface set including the communication links 210, 236, 232, 214, and 216 of FIG. 2C) associated with the physical router. Line 4 may specify a loopback address for control packets associated with the BGP that may be used by the example meta-router 230 to set up TCP listening sockets within the protocol sockets 310a-b associated with the physical router. Line 5 may define an outgoing interface within one of the interfaces 302 and/or 303 to the physical router. Line 6 may specify a number of most significant bits of an address prefix used by the switch fabric 312 to route control packets. Additionally, lines 7 and 8 may specify identification information associated with the REAP router other way. For example, the example external interface 302, the example router array interface 303, the communication link bundles 304 and 305, the example protocol queues 306a-b, the example packet sockets 308a-b, the example protocol sockets 310a-b, the example switch fabric 312, the example forwarding table 314, the example address space manager 316, the example duplicate manager 318, and/or the example RDU cache 320 illustrated in FIG. 3 may be implemented separately and/or in any combination using, for example, machine-accessible or readable instructions executed by one or more computing devices and/or computing platforms (e.g., the example processing platform P100 of FIG. 8).

Further, the example external interface 302, the example router array interface 303, the communication link bundles 304 and 305, the example protocol queues 306a-b, the example packet sockets 308a-b, the example protocol sockets 310a-b, the example switch fabric 312, the example forwarding table 314, the example address space manager 316, the example duplicate manager 318, example RDU cache 320 and/or, more generally, the example meta-router 230 may be implemented by hardware, software, firmware and/or any combination of hardware, software and/or firmware. Thus, for example, any of the example external interface 302, the example router array interface 303, the communication link bundles 304 and 305, the example protocol queues 306a-b, the example packet sockets 308a-b, the example protocol sockets 310a-b, the example switch fabric 312, the example forwarding table 314, the example address space manager 316, the example duplicate manager 318, example RDU cache 320 and/or, more generally, the example meta-router 230 can be implemented by one or more circuit(s), programmable processor(s), application specific integrated circuit(s) (ASIC(s)), programmable logic device(s) (PLD(s)) and/or field programmable logic device(s) (FPLD(s)), etc. When any of the appended apparatus claims are read to cover a purely software implementation, at least one of the example external interface 302, the example router array interface 303, the communication link bundles 304 and 305, the example protocol queues 306a-b, the example packet sockets 308a-b, the example protocol sockets 310a-b, the example switch fabric 312, the example forwarding table 314, the example address space manager 316, the example duplicate manager 318, and/or the example RDU cache 320 are hereby expressly defined to include a tangible medium such as a memory, DVD, CD, etc. Further still, the example meta-router 230 of FIG. 3 may include one or more elements, processes and/or devices in addition to, or instead of, those illustrated in FIG. 3, and/or may include more than one of any or all of the illustrated elements, processes and devices.

Figure 4:
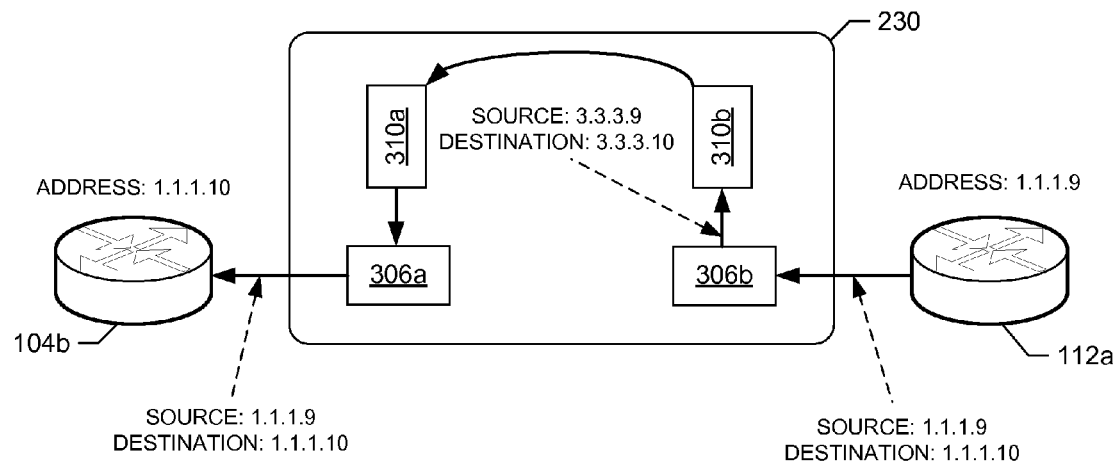
FIG. 4 illustrates the example meta-router of FIG. 3 performing address translation to route control packet(s).

FIG. 4 illustrates the example meta-router 230 of FIG. 3 performing address translation for control packet routing. FIG. 4 shows the meta-router 230, protocol queues 306a-b, and protocol sockets 310a-b. The other components of the meta-router 230 shown in FIG. 3 are omitted for clarity and brevity. Additionally, the splitter 202 and the REAP router 110 are not shown. While the example in FIG. 4 shows one type of address translation for BGP, the example meta-router 230 may include other functional components for performing address translation for other types of communication protocols and/or translation for network prefix information included within a payload of the control packets.

In the example of FIG. 4, the physical router 112a, which is included within the router array 218 (not shown), is assigned a source address of 1.1.1.9. During a BGP peering connection with the external router 104b, the physical router 112a transmits a reply and/or response message to a loopback address (e.g., 1.1.1.10) of the external router 104b. The reply and/or response message may be included within one or more control packets with a source address of 1.1.1.9 and a destination address of 1.1.1.10. Because the physical router 112a operates as if the control packet(s) are being transmitted directly to the external router 104b, the physical router 112a transmits the control packet(s) to the destination address 1.1.1.10. However, the physical router 112a does not select a route for the control packet(s) by transmitting the control packet(s) via the communication link 214 to the splitter 202 as described in conjunction with FIG. 2B. Instead, the example meta-router 230 performs the routing function by routing the control packet(s) to an appropriate interface communicatively coupled to the external router 104b.

Upon receiving the control packet(s), the protocol queue 306b identifies the source and/or destination address and accesses a translation reference table and/or list for corresponding representative addresses used locally by the meta-router 230. In this example, the protocol queue 306b determines that the 1.1.1.9 source address corresponds to a 3.3.3.9 address and the 1.1.1.10 destination address corresponds to a 3.3.3.10 address. The protocol queue 306b then replaces (e.g., translates) the source and destination addresses in a header(s) of the control packet(s) with the corresponding addresses and forwards the control packet(s) to the protocol socket 310b. The protocol socket 310b then prepares the control packet(s) for processing by the switch fabric 312 (not shown). In examples where the packet is associated with the OSPF protocol, the packet sockets 308a-b may translate the addresses. The switch fabric 312 accesses the forwarding table 314 using the translated destination address to determine an outgoing interface and/or the external router 104b that corresponds to the destination address and/or the outgoing interface.

The protocol socket 310a receives the control packet(s) from the switch fabric 312 via a socket corresponding to a selected outgoing interface. The protocol socket 310a forwards the control packet(s) to the protocol queue 306(a), which then accesses a reference table to translate the source and destination address into the original addresses (e.g., 1.1.1.9 and 1.1.1.10) transmitted by the physical router 112a. The protocol queue 306a sends the translated control packet(s) to the external router 104b via the outgoing interface to the splitter 202. In this manner, the address translation performed by the meta-router 230 causes the external router 104b to operate as if the control packets are sent directly from the physical router 112a. As a result of this address translation, the meta-router 230 may perform control packet routing for the REAP router 110 without having to reconfigure external routers to accommodate the REAP router 110.

Figure 5:
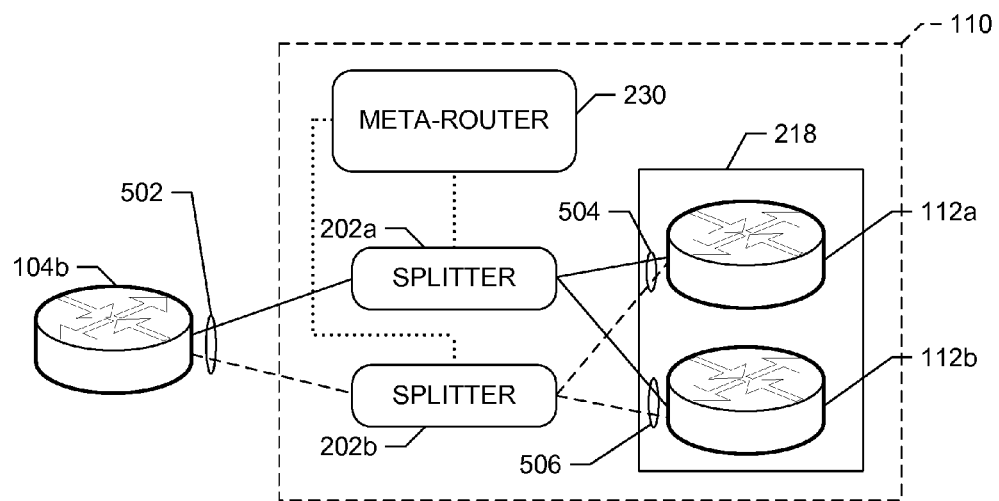
FIG. 5 illustrates the example REAP router of FIGS. 1, 2A, 2B, and/or 2C implementing link bundling.

FIG. 5 illustrates the example REAP router 110 of FIGS. 1, 2A, 2B, and/or 2C implementing link bundling. In some REAP routers 110 with a relatively large number of physical routers within the router array 218, the splitter 202 may be partitioned into two or more splitters 202a-b to distribute data packet and/or control packet forwarding loads. The splitter 202 may also be partitioned into the splitters 202a-b in instances where the single splitter 202 bottlenecks data packet routing. In other examples, the splitter 202a may be a primary splitter while the splitter 202b functions as a redundant and/or backup splitter. Further, other examples may include additional splitters.

The example splitters 202a-b are communicatively coupled to the meta-router 230, the external router 104b, and the physical routers 112a-b within the router array 218. Because the REAP router 110 may not include a router to route packets among the splitters 202a-b, the splitters 202a-b may include forwarding tables and be communicatively coupled to all of the physical routers (e.g., the routers 112a-b) within the router array 218. In this manner, each of the splitters 202a-b functions similarly to the splitter 202, with the incoming data packets distributed between the splitters 202a-b.

The example in FIG. 5 shows that communication links from the external router 104 to the splitters 202a-b are bundled together by a first bundle 502. The first bundle 502 functions as a composite layer-3 link that includes physical communication links to the splitters 202*a-b*. Additionally, communication links from the splitters 202*a-b* to the physical router 112*a* are grouped together in a single logical layer-3 link by a second bundle 504 and communication links from the splitters 202*a-b* to the physical router 112*b* are grouped together by a second bundle 506. Using the bundles 502-506, the example REAP router 110 may perform load balancing among the splitters 202*a-b* and across multiple physical communication links on a per-flow basis. In other words, because the partitioning is preformed similarly by the splitters 202*a-b* based on address space, packets within a similar flow continue to be sent by the splitters 202*a-b* to the same physical router 112*a-b*. As a result of the link bundles 502-506, the example REAP router 110 may partition data packet and/or control packet routing without increasing packet routing times.

Figure 6A:
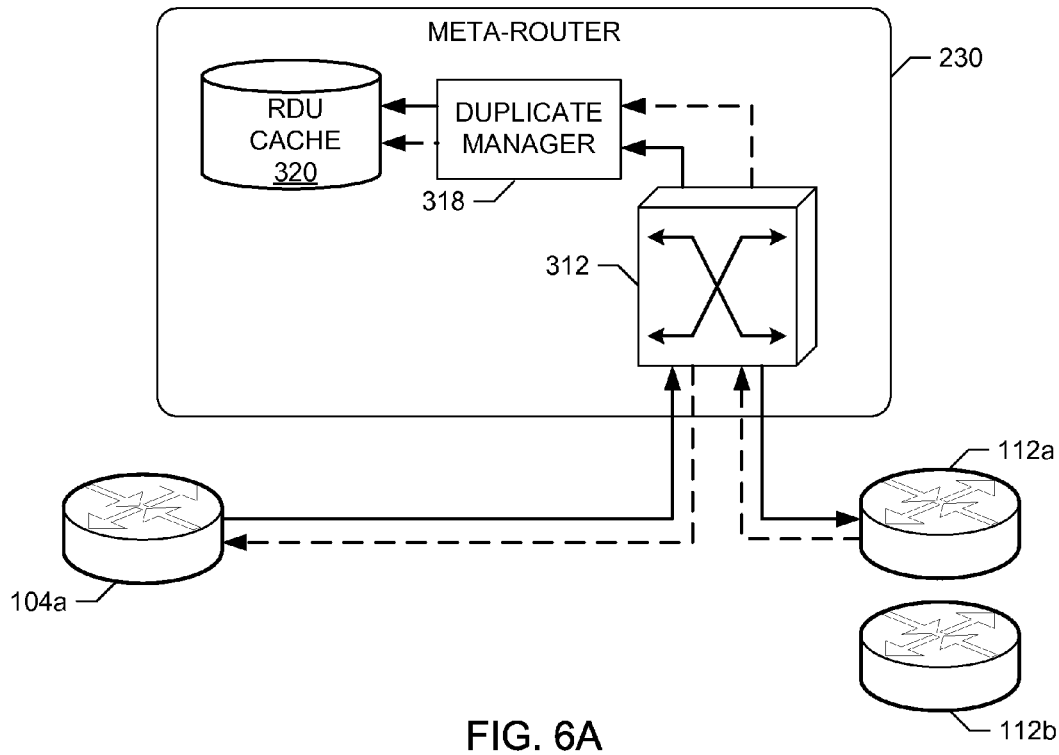
FIGS. 6A and 6B illustrate the example meta-router of FIG. 3 transitioning to a secondary router within a router array.
Figure 6B:
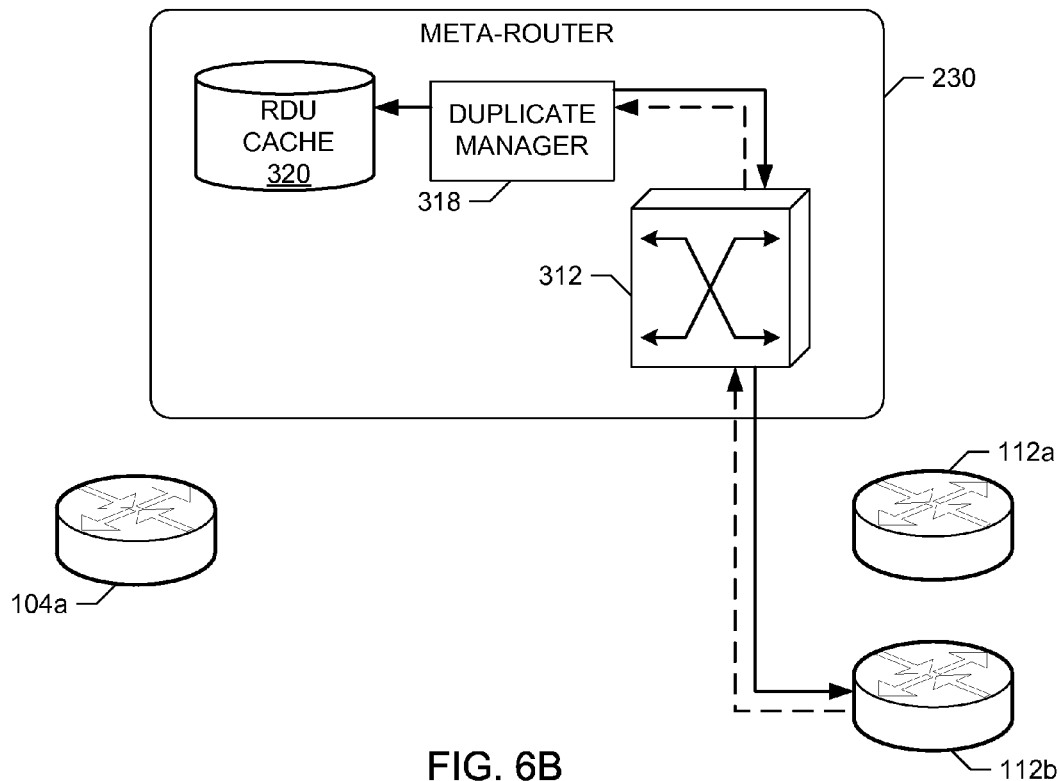

FIGS. 6A and 6B illustrate the example meta-router 230 of FIG. 3 transitioning to a secondary router (e.g., the physical router 112*b*) within the router array 218. In the examples of FIGS. 6A and 6B, only the meta-router 230, the switch fabric 312, the duplicate manager 318 and the RDU cache 320 are shown for clarity and brevity. Additionally, while the physical routers 112*a-b* are shown, other physical routers within the router array 218 may be used as redundant routers.

FIG. 6A shows the physical router 112*a* within the REAP router 110 communicating with the external router 104*a* during a peering session. During this session, the external router 104*a* and the physical router 112*a* exchange control packets with reachability information. In this manner, the external router 104*a* and the physical router 112*a* may establish a network route and/or communication path for routing packets within the communication system 100 of FIG. 1.

During the exchange of control packets, the duplicate manager 318 makes a copy of the control packets as the control packets are routed by the switch fabric 312. The duplicate manager 318 then stores the copies of the control packets to the RDU cache 320. In other examples, the duplicate manager 318 may copy and store control information included within the control packets. Alternatively, the duplicate manager 318 may copy and store the control information as RDUs associated with an address subspace. In addition to copying and storing control plane information within the RDU cache 320, the duplicate manager 318 may organize and/or optimize the storage of the control plane information.

FIG. 6B shows that the example meta-router 230 has switched routing to the secondary physical router 112*b*. The meta-router 230 may switch control to a secondary router when the primary physical router 112*a* fails and/or a communication link to the router 112*a* fails. The meta-router 230 may include functionality to monitor the physical routers 112*a-b*. Alternatively, the example duplicate manager 318 may monitor control packets to detect when a router fails. In other examples, the duplicate manager 318 may receive a message that indicates the physical router 112*a* will be taken offline. In yet other examples, the duplicate manager 318 may determine that the physical router 112*a* is experiencing a relatively large traffic load and reduce the address subspace assigned to the router 112*a*.

Upon determining that the secondary router 112*b* is to route data packets as a replacement to the primary physical router 112*a*, the duplicate manager 318 accesses the RDU cache 320 and retrieves the control plane information (e.g., control packets) associated with the primary physical router 112*a*. The duplicate manager 318 then transmits the control plane information to the physical router 112*b*. If the physical router 112*b* sends a reply and/or request message for additional control plane information, the duplicate manager 318 accesses the RDU cache 320 and transmits the appropriate control plane information to the router 112*b*. In addition to sending control packets to the secondary router 112*b*, the example duplicate manager 318 may also send instructions to the splitter 202 to adjust forwarding tables to reflect the router change. In this manner, the REAP router 110 may adjust address subspaces assigned to routers and/or bring secondary routers online without having to send control packets to external routers. Thus, the change of the physical routers 112*a-b* occurs without the external router 104*b* being aware of the change.

Figure 7A:
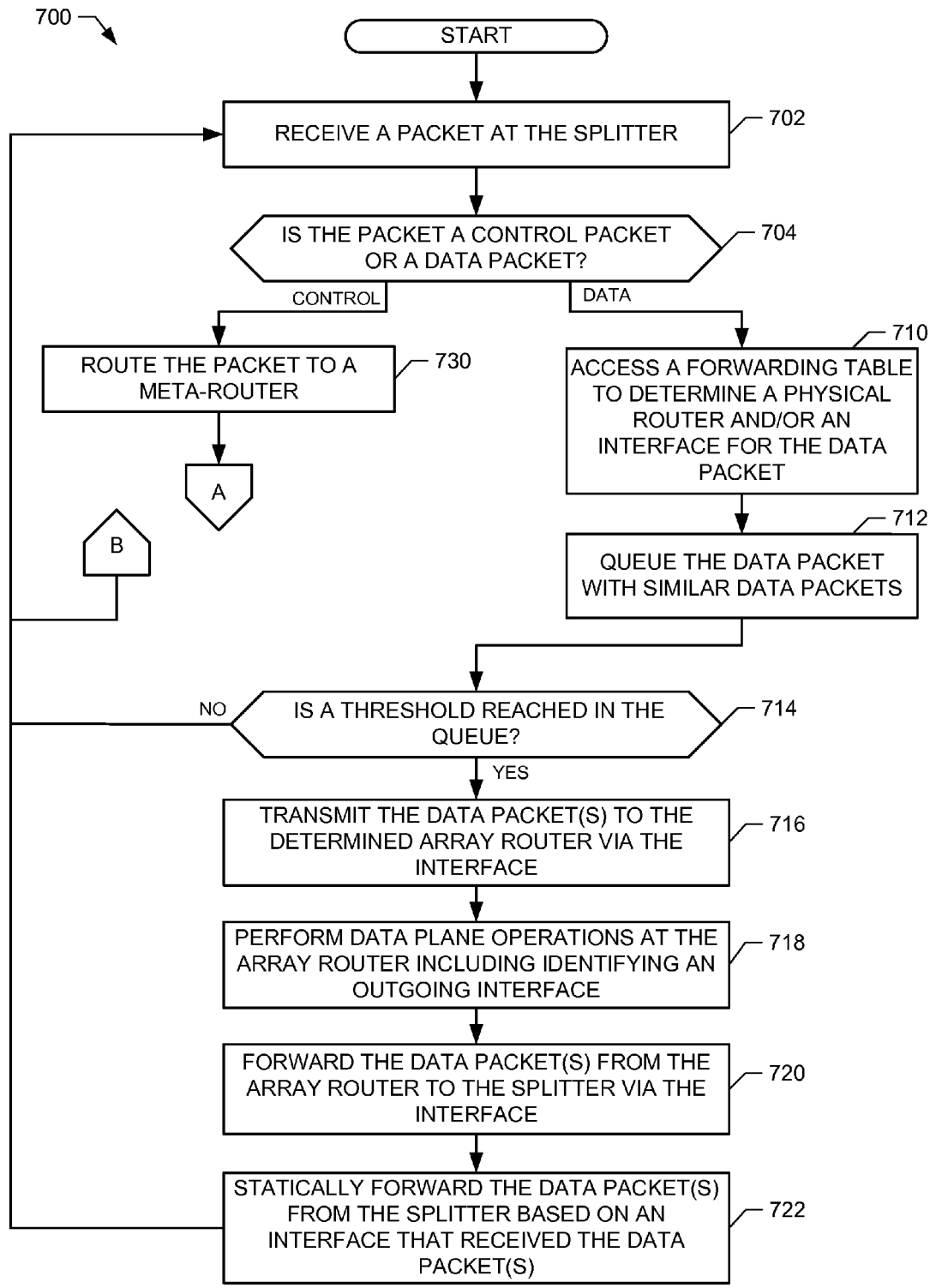
FIGS. 7A-7C are flowcharts representative of example machine-accessible instructions that may be executed to implement the example REAP router, the meta-router, the splitter and/or the router array of FIGS. 1-6B.
Figure 7B:
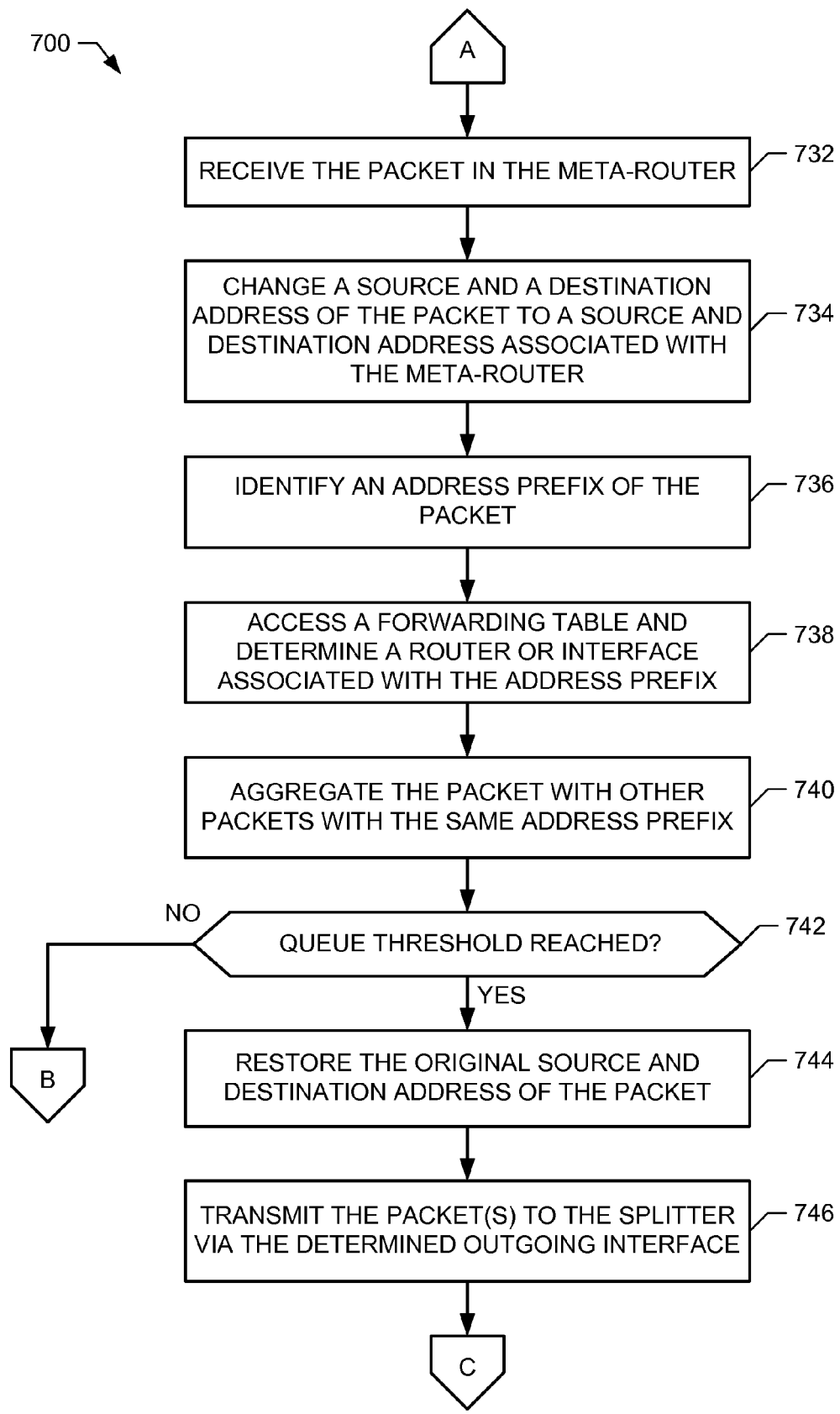
Figure 7C:
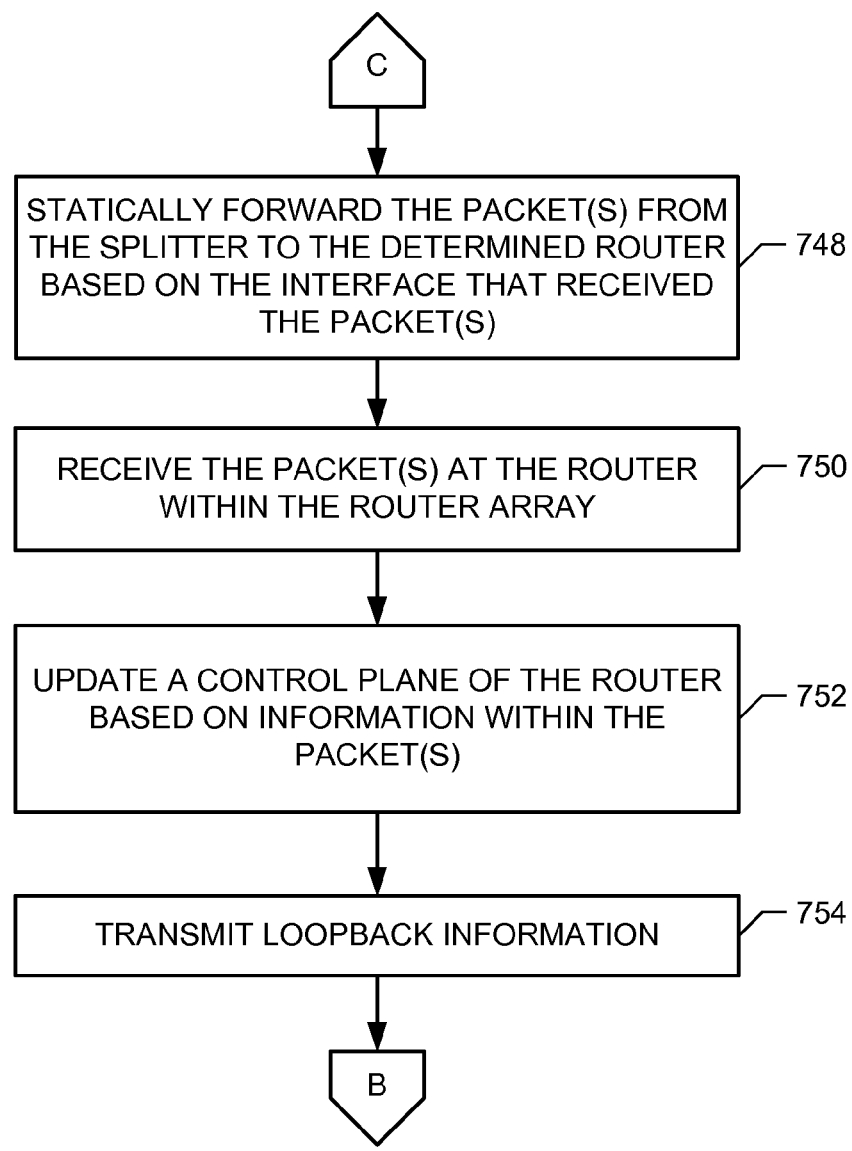

FIGS. 7A-7C are flowcharts representative of example machine-accessible instructions that may be executed by a machine to implement the example external interface 302, the example router array interface 303, the communication link bundles 304 and 305, the example protocol queues 306*a-b*, the example packet sockets 308*a-b*, the example protocol sockets 310*a-b*, the example switch fabric 312, the example forwarding table 314, the example address space manager 316, the example duplicate manager 318, example RDU cache 320 and/or, more generally, the example meta-router 230 of FIGS. 1-6B. The example instructions of FIGS. 7A-7C may be carried out or executed by a processor, a controller and/or any other suitable processing device. For example, the example instructions of FIGS. 7A-7C may be embodied in coded instructions stored on any tangible computer-readable medium such as a flash memory, a CD, a DVD, a floppy disk, a ROM, a RAM, a programmable ROM (PROM), an electronically-programmable ROM EPROM, EEPROM, an optical storage disk, an optical storage device, magnetic storage disk, a magnetic storage device, and/or any other tangible or non-tangible medium that can be used to carry or store program code and/or instructions in the form of methods or data structures, and which can be accessed and executed by a processor, a general-purpose or special-purpose computer, or other machine with a processor (e.g., the example processor platform P100 discussed below in connection with FIG. 8). Combinations of the above are also included within the scope of computer-readable media. Alternatively, some or all of the example instructions represented by FIGS. 7A-7C may be implemented using any combination(s) of ASIC(s), PLD(s), FPLD(s), discrete logic, hardware, firmware, etc.

Also, one or more of the example instructions represented by FIGS. 7A-7C may instead be implemented using manual operations or as any combination of any of the foregoing techniques, for example, any combination of firmware, software, discrete logic and/or hardware. Furthermore, many other methods of implementing the example instructions of FIGS. 7A-7C may be employed. For example, the order of execution of the blocks may be changed, and/or one or more of the blocks described may be changed, eliminated, subdivided, or combined. Additionally, any or all of the example instructions of FIGS. 7A-7C may be carried out sequentially and/or carried out in parallel by, for example, separate processing threads, processors, devices, discrete logic, circuits, etc.

The example instructions 700 of FIGS. 7A-7C route packets within the example REAP router 110 of FIGS. 1-6B. Multiple instances of the example instructions 700 may be executed in parallel or series to route packets within the REAP router 110. Additionally, while the example instructions 700 describe routing packets received from an external router, the instructions 700 associated with routing control packets may be substantially similar for control packets transmitted by physical routers within the router array 218.

The example instructions 700 of FIG. 7C begin when the REAP router 110 receives a packet at the splitter 202 (block 702). The example instructions 700 (e.g., the splitter 202) then determine if the packet is a control packet or a data packet (block 704). If the example instructions 700 determine that the packet is a data packet (block 704), the example instructions (e.g., the splitter 202) access a forwarding table to determine a physical router and/or an interface (e.g., a communication link) to which the data packet is to be forwarded (block 710). Upon determining a physical router and/or an interface, the example instructions 700 (e.g., the splitter 202) queues the data packet with similar data packets (block 712).

The example instructions 700 continue with the splitter 202 determining if the threshold is reached (block 714). If the threshold is not reached, the example instructions 700 return to receiving packets (block 702). However, if the threshold is reached, the example instructions 700 (e.g., the splitter 202) transmit the similar data packet(s) in the queue to the determined physical router via the interface and/or corresponding communication link (block 716). The example instructions 700 (e.g., the physical router) then perform data plane operations on the data packet(s) (block 718). Data plane operations may include identifying an outgoing interface to transmit the data packet(s) to a destination specified within a header of the data packet(s).

Upon identifying an outgoing interface, the example instructions 700 (e.g., the physical router) transmit the data packet(s) to the splitter via the interface and/or the communication link (block 720). The example instructions 700 (e.g., the splitter 202) statically forward the data packet(s) to an external router and/or destination based on the interface that received the data packet(s) (block 722). The example instructions 700 (e.g., the REAP router 110) continue by receiving a packet at the splitter 202 (block 702).

However, if the example instructions 700 (e.g., the splitter 202) determine that the received packet is a control packet (block 704), the example instructions route the packet to the meta-router 230 (block 730). Next, the example instructions 700 (e.g., the external interface 302) of FIG. 7B receive the control packet (block 732). The example instructions 700 (e.g., the protocol queue 706) then change a source and/or a destination address of the packet to a source and/or destination address local to the meta-router 230 (block 734). The example instructions may also translate an address prefix within a payload of the control packet. The example instructions 700 (e.g., the protocol socket 310a) may then identify an address prefix of the control packet (block 736). In other examples, the example instructions 700 may identify a source and/or destination address within header(s) of the control packet. The example instructions 700 (e.g., the switch fabric 312) access the forwarding table 314 and determine a physical router, socket and/or interface associated with the address (block 738). Additionally, the example instructions 700 (e.g., the protocol queues 306a-b and/or the switch fabric 312) aggregate the control packet with packets having similar address prefixes, source addresses, and/or destination addresses (block 740).

The example instructions 700 (e.g., the protocol queues 306a-b and/or the switch fabric 312) continue by determining if a queue threshold is reached (block 742). If the threshold is not reached, the example instructions 700 (e.g., the REAP router 110) return to receiving packets (block 702). However, if the threshold is reached, the example instructions 700 (e.g., the protocol queue 306b) restores (e.g., translates) the original prefix, source, and/or destination address of the control packet(s) (block 744). Additionally, the example instructions 700 (e.g., the switch fabric 312) may route the control packet(s) to the appropriate socket within the protocol socket 310b. In some examples, the example instructions 700 may route the packet(s) to the socket prior to translating the packet(s). The example instructions 700 (e.g., the router array interface 303) then transmit the control packet(s) to the splitter 202 via the identified outgoing interface (block 746).

The example instructions 700 (e.g., the splitter 202) of FIG. 7C continue by statically forwarding the control packet(s) to the physical router via a communication link based on an interface that received the packet(s) (block 748). Next, the example instructions 700 (e.g., the physical router) receive the control packet(s) at the physical router within the router array 218 (block 750). In other examples, when a physical router transmits packets to the splitter 202, the example instructions 700 may route the control packet(s) to an external router corresponding to a destination address within a header of the control packet(s). Upon receiving, the example instructions 700 (e.g., via the physical router) update a control plane of the router based on control information within a payload of the packet(s) (block 752). In some examples, the example instructions 700 may transit loopback control information to the external router that originated the control packet(s) via the splitter 202 and/or the meta-router 230 (block 754). Next, the example instructions 700 return to receiving packets that the splitter 202 (block 702).

Figure 8:
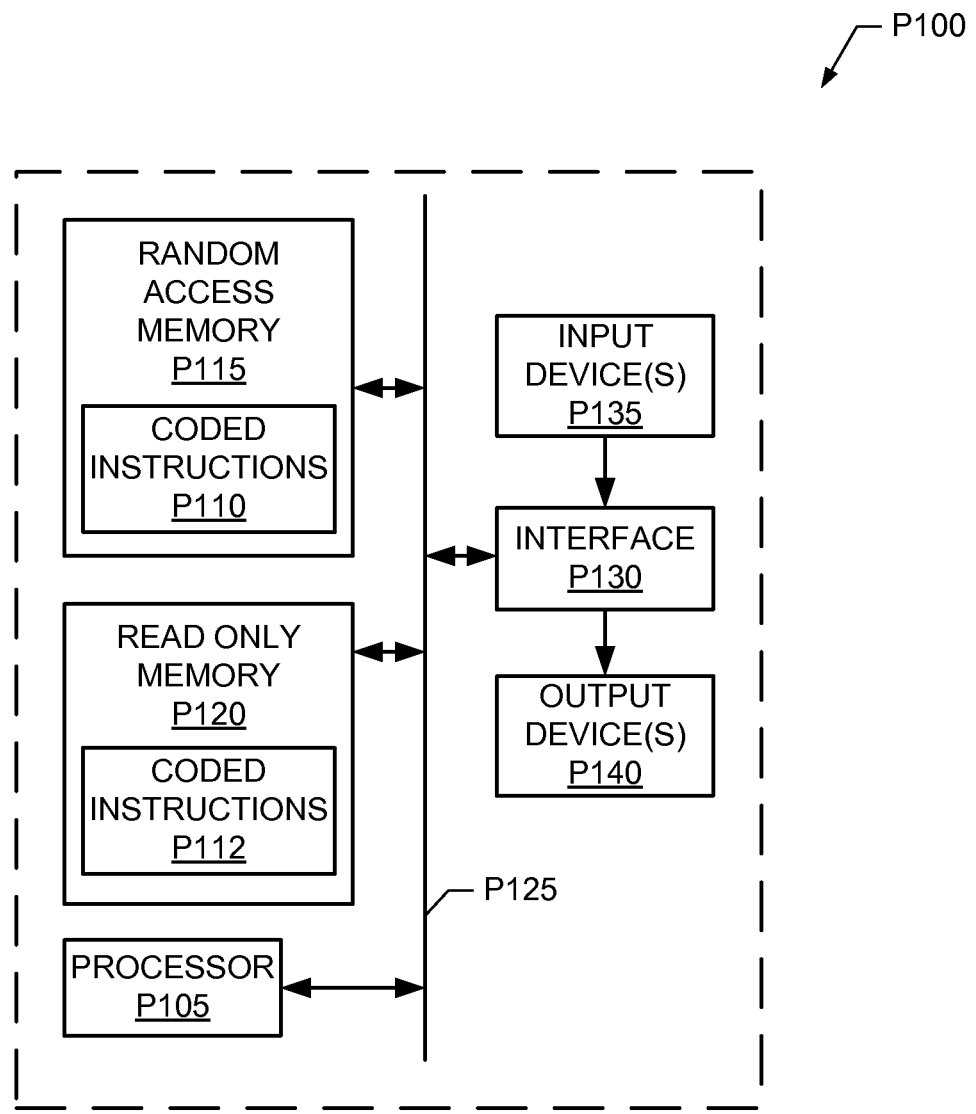
FIG. 8 is a schematic illustration of an example processor platform that may be used and/or programmed to execute the example instructions of FIGS. 7A-7C to implement any of all of the example methods and apparatus disclosed herein.

FIG. 8 is a schematic diagram of an example processor platform P100 that may be used and/or programmed to execute the instructions of FIGS. 7A-7C to implement the example external interface 302, the example router array interface 303, the communication link bundles 304 and 305, the example protocol queues 306a-b, the example packet sockets 308a-b, the example protocol sockets 310a-b, the example switch fabric 312, the example forwarding table 314, the example address space manager 316, the example duplicate manager 318, example RDU cache 320 and/or, more generally, the example meta-router 230 of FIGS. 1-6B. For example, the processor platform P100 can be implemented by one or more general-purpose processors, processor cores, microcontrollers, etc.

The processor platform P100 of the example of FIG. 8 includes at least one general purpose programmable processor P105. The processor P105 executes coded instructions P110 and/or P112 present in main memory of the processor P105 (e.g., within a RAM P115 and/or a ROM P120). The coded instructions P110 and/or P112 may be the instructions of FIGS. 7A-7C. The processor P105 may be any type of processing unit, such as a processor core, a processor and/or a microcontroller. The processor P105 may execute, among other things, the example processes of FIGS. 7A-7C to implement the example methods, articles of manufacture, and apparatus described herein.

The processor P105 is in communication with the main memory (including a ROM P120 and/or the RAM P115) via a bus P125. The RAM P115 may be implemented by DRAM, SDRAM, and/or any other type of RAM device, and ROM may be implemented by flash memory and/or any other desired type of memory device. Access to the memory P115 and the memory P120 may be controlled by a memory controller (not shown). One or both of the example memories P115 and P120 may be used to implement the example forwarding table 314 and/or RDU cache 320 of FIG. 3.

The processor platform P100 also includes an interface circuit P130. The interface circuit P130 may be implemented by any type of interface standard, such as an external memory interface, serial port, general-purpose input/output, etc. One or more input devices P135 and one or more output devices P140 are connected to the interface circuit P130.

At least some of the above described example methods and/or apparatus are implemented by one or more software and/or firmware programs running on a computer processor. However, dedicated hardware implementations including, but not limited to, application specific integrated circuits, programmable logic arrays and other hardware devices can likewise be constructed to implement some or all of the example methods and/or apparatus described herein, either in whole or in part. Furthermore, alternative software implementations including, but not limited to, distributed processing or component/object distributed processing, parallel processing, or virtual machine processing can also be constructed to implement the example methods and/or apparatus described herein.

It should also be noted that the example software and/or firmware implementations described herein are stored on a tangible storage medium, such as: a magnetic medium (e.g., a magnetic disk or tape); a magneto-optical or optical medium such as an optical disk; or a solid state medium such as a memory card or other package that houses one or more read-only (non-volatile) memories, random access memories, or other re-writable (volatile) memories. Accordingly, the example software and/or firmware described herein can be stored on a tangible storage medium such as those described above or successor storage media.

Additionally, although this patent discloses example apparatus including software or firmware executed on hardware, it should be noted that such apparatus are merely illustrative and should not be considered as limiting. For example, it is contemplated that any or all of these hardware and software components could be embodied exclusively in hardware, exclusively in software, exclusively in firmware or in some combination of hardware, firmware and/or software. Accordingly, while the above specification described example apparatus, methods and articles of manufacture, the examples are not the only way to implement such apparatus, methods and articles of manufacture. Therefore, although certain example methods, apparatus and articles of manufacture have been described herein, the scope of coverage of this patent is not limited thereto. On the contrary, this patent covers all methods, apparatus and articles of manufacture fairly falling within the scope of the appended claims either literally or under the doctrine of equivalents.

What is claimed is:

1. A method to route control packets based on address partitioning, the method comprising:
    identifying, at a meta-router implemented by a processor, a destination address value of a control packet received from a server as corresponding to a first destination address, the first destination address being associated with a first router, the meta-router to return the control packet back to the server via one of a plurality of incoming interfaces of the server to cause the server to then forward the control packet to the first router based on which one of the plurality of incoming interfaces of the server received the control packet by:
        changing, at the meta-router, the destination address value of the control packet to a second destination address for routing the control packet within the meta-router, the second destination address being associated with the meta-router;
    accessing, at the meta-router, a forwarding table to determine a first outgoing interface of the meta-router to forward the control packet to the first router, the forwarding table including information cross-referencing the second destination address to at least one of the first router and the first outgoing interface, the first outgoing interface in communication with a first one of the incoming interfaces of the server;
    prior to the meta-router forwarding the control packet via the first outgoing interface to cause the server to forward the control packet to the first router, changing, at the meta-router, the destination address value of the control packet back to the first destination address;
    transmitting the control packet from the meta-router back to the server via the outgoing interface to cause the server to statically forward the control packet to the first router based on the first one of the incoming interfaces of the server that received the packet from the meta-router.

2. The method as defined in claim 1, wherein an address prefix of the control packet is included within the first destination address.

3. The method as defined in claim 1, wherein the first outgoing interface is determined based on which of a plurality of incoming interfaces of the meta-router received the control packet from the server.

4. The method as defined in claim 1, wherein the first router is to update control plane information based on information within the control packet.

5. The method as defined in claim 4, wherein the control plane information includes at least one of a routing path, a router address, an address subspace associated with the first router, and a next hop address of an adjacent router.

6. The method as defined in claim 1, further including:
    aggregating the control packet with a second packet that has a same address prefix as the control packet; and
    transmitting the second packet with the control packet.

7. The method as defined in claim 1, further including:
    upon receiving the control packet at the meta-router, identifying a source address value of the control packet as corresponding to a first source address, the first source address being associated with a second router that sent the control packet to the server;
    changing the source address value of the control packet to a second source address, the second source address being associated with the meta-router; and
    prior to forwarding the control packet to the first router via the first outgoing interface, changing the source address value of the control packet back to the first source address.

8. A meta-router to route control packets based on address partitioning, the meta-router comprising:
    memory including machine readable instructions;
    a processor to execute the machine readable instructions to perform operations including:
        identifying a destination address value of a packet received from a server as corresponding to a first destination address, the first destination address being associated with a first router, the meta-router to return the control packet back to the server via one of a plurality of incoming interfaces of the server to cause the server to then forward the control packet to the first router based on which one of the plurality of incoming interfaces of the server received the control packet by:

changing the destination address value of the packet to a second destination address for routing the packet within the meta-router, the second destination address being associated with the meta-router;

accessing a forwarding table to determine a first outgoing interface of the meta-router to forward the packet to the first router, the forwarding table including information cross-referencing the second destination address to at least one of the first router and the first outgoing interface, the first outgoing interface in communication with a first one of the incoming interfaces of the server;

prior to forwarding the packet via the first outgoing interface to cause the server to forward the control packet to the first router, changing the destination address value of the packet back to the first destination address; and transmitting the packet back to the server via the outgoing interface to cause the server to statically forward the packet to the first router based on the first one of the incoming interfaces of the server that received the packet from the meta-router.

9. The meta-router as defined in claim 8, wherein the operations performed by the processor further include:

identifying a source address value of the packet as corresponding to a first source address, the first source address being associated with a second router that sent the control packet to the server;

changing the source address value of the packet to a second source address, the second source address being associated with the meta-router; and prior to forwarding the packet to the first router via the first outgoing interface, changing the source address value of the packet back to the first source address.

10. The meta-router as defined in claim 8, wherein the first router is at least one of (a) an external network router and (b) included within an array of routers.

11. The meta-router as defined in claim 10, wherein the array of routers is associated with an address space and the first router is associated with an address subspace of the address space.

12. The meta-router as defined in claim 8, further including a duplicate manager to store information within the packet.

13. The meta-router as defined in claim 12, wherein the operations performed by the processor further include sending the information to a third router upon receiving an instruction from the third router at the meta-router indicating the third router is replacing the first router.

14. The meta-router as defined in claim 8, wherein the server is to:

receive the packet;

determine the packet is a control packet; and forward the packet to the meta-router.

15. The meta-router as defined in claim 8, wherein the operations further include:

aggregating the packet with a second packet that has a same address prefix as the packet; and transmitting the second packet with the packet.

16. A tangible machine-readable storage device including instructions that, when executed by a processor implementing a meta-router, cause the processor to perform operations comprising:

upon receiving a control packet from a server, identifying a destination address value of the control packet as corresponding to a first destination address, the first destination address being associated with a first router, the meta-router to return the control packet back to the server via one of a plurality of incoming interfaces of the server to cause the server to then forward the control packet to the first router based on which one of the plurality of incoming interfaces of the server received the control packet by:

changing the destination address value of the control packet to a second destination address for routing the control packet within the meta-router;

accessing a forwarding table to determine a first outgoing interface of the meta-router to forward the control packet to the first router, the forwarding table including information cross-referencing the second destination address to at least one of the first router and the first outgoing interface, the first outgoing interface in communication with a first one of the incoming interfaces of the server;

prior to forwarding the control packet via the first outgoing interface to cause the server to forward the control packet to the first router, changing the destination address value of the control packet back to the first destination address; and transmitting the control packet via the outgoing interface to cause the server to statically forward the control packet to the first router based on the first one of the incoming interfaces of the server that received the control packet from the outgoing interface.

* * * * *